(12) United States Patent
Gallagher, III

(10) Patent No.: US 12,288,211 B2
(45) Date of Patent: Apr. 29, 2025

(54) SECURE AUTHENTICATION AND TRANSACTION SYSTEM AND METHOD

(71) Applicant: Multiple Shift Key, Inc., Rancho Cucamonga, CA (US)

(72) Inventor: Raymond J. Gallagher, III, Colo De Caza, CA (US)

(73) Assignee: Multiple Shift Key, Inc., Rancho Cucamonga, CA (US)

( * ) Notice: Subject to any disclaimer, the term of this patent is extended or adjusted under 35 U.S.C. 154(b) by 847 days.

(21) Appl. No.: 15/967,377

(22) Filed: Apr. 30, 2018

(65) Prior Publication Data

US 2019/0333062 A1   Oct. 31, 2019
US 2023/0196357 A9   Jun. 22, 2023

Related U.S. Application Data

(63) Continuation of application No. 14/797,160, filed on Jul. 12, 2015, now abandoned, which is a
(Continued)

(51) Int. Cl.
*G06Q 20/40* (2012.01)
*G06Q 20/38* (2012.01)
(Continued)

(52) U.S. Cl.
CPC ....... *G06Q 20/401* (2013.01); *G06Q 20/3829* (2013.01); *G06Q 20/385* (2013.01);
(Continued)

(58) Field of Classification Search
None
See application file for complete search history.

(56) References Cited

U.S. PATENT DOCUMENTS 7,478,434 B1 *  1/2009  Hinton .................. G06F 16/958
                                                        726/28
7,861,077 B1 * 12/2010  Gallagher, III ......... H04L 63/08
                                                        713/155
(Continued)

FOREIGN PATENT DOCUMENTS

WO           0190968 A1    11/2001
WO      WO-0219593 A2 *     3/2002  ......... H04L 63/0853

OTHER PUBLICATIONS

Soppera, A; Burbridge, T. "Wireless identification—privacy and security", BT Technology Journal 23.4: 54-64. Ipswich: British Telecommunications PLC. (Oct. 2005) (Year: 2005).*

(Continued)

*Primary Examiner* — Clay C Lee
(74) *Attorney, Agent, or Firm* — Brooks Kushman P.C.

(57) ABSTRACT

A secure user authentication system, operable over a client-server communications network to authenticate a system user. The system includes an application server which includes a site which is able to be enabled, and an authentication server, which is able to enable the application server site. The authentication server includes a core database, and receives and stores user authentication-enabling data in the core database. The system further includes a client, and a client program which is able to be actuated in the client. The client program includes the user authentication-enabling data. Upon actuation, the client program automatically directly connects to the authentication server, and sends the client authentication-enabling data to the authentication server, for secure user authentication by the authentication server.

41 Claims, 17 Drawing Sheets

Related U.S. Application Data continuation of application No. 12/978,105, filed on Dec. 23, 2010, now Pat. No. 9,112,842, which is a continuation of application No. 11/544,302, filed on Oct. 6, 2006, now Pat. No. 7,861,077.

(60) Provisional application No. 60/724,691, filed on Oct. 7, 2005.

(51) Int. Cl.
    *H04L 9/30* (2006.01)
    *H04L 9/40* (2022.01)

(52) U.S. Cl.
    CPC .............. *H04L 9/30* (2013.01); *H04L 63/083* (2013.01); *H04L 63/0853* (2013.01)

(56) References Cited

U.S. PATENT DOCUMENTS

| | | | | |
|---|---|---|---|---|
| 8,819,424 B2* | 8/2014 | Soulios | ................... | H04L 63/08 713/168 |
| 2001/0045451 A1* | 11/2001 | Tan | ........................ | G06Q 20/12 235/375 |
| 2002/0010679 A1* | 1/2002 | Felsher | ................ | G06F 21/6245 705/51 |
| 2003/0140007 A1 | 7/2003 | Kramer et al. | | |
| 2004/0017934 A1* | 1/2004 | Kocher | ................... | G06V 40/11 382/125 |
| 2005/0027543 A1 | 2/2005 | Labrou et al. | | |
| 2005/0166263 A1* | 7/2005 | Nanopoulos | ........ | H04L 63/0838 726/19 |
| 2005/0246292 A1* | 11/2005 | Sarcanin | ............ | G06Q 20/3674 705/67 |
| 2006/0010324 A1* | 1/2006 | Appenzeller | ........... | H04L 9/083 713/171 |
| 2011/0283110 A1* | 11/2011 | Dapkus | ................. | G06F 21/577 713/182 |
| 2013/0332355 A1 | 12/2013 | Atsmon et al. | | |
| 2014/0282978 A1* | 9/2014 | Lerner | ................. | H04L 63/083 726/7 |
| 2017/0346851 A1* | 11/2017 | Drake | ................... | H04W 12/02 |

OTHER PUBLICATIONS

Corner, M. D., "Transient Authentication for Mobile Devices", University of Michigan, ProQuest Dissertations & Theses, 2003. 3106037. (Year: 2003).

* cited by examiner

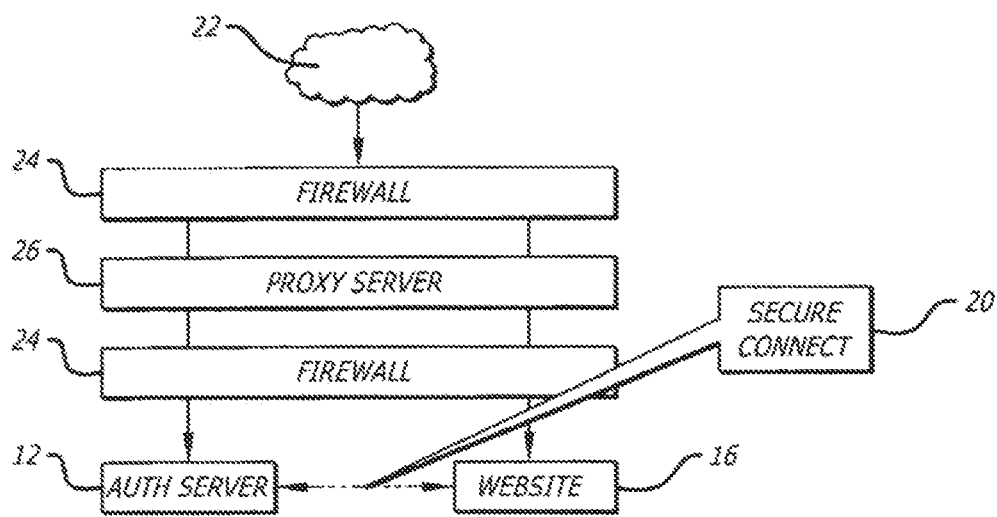
FIG. 4
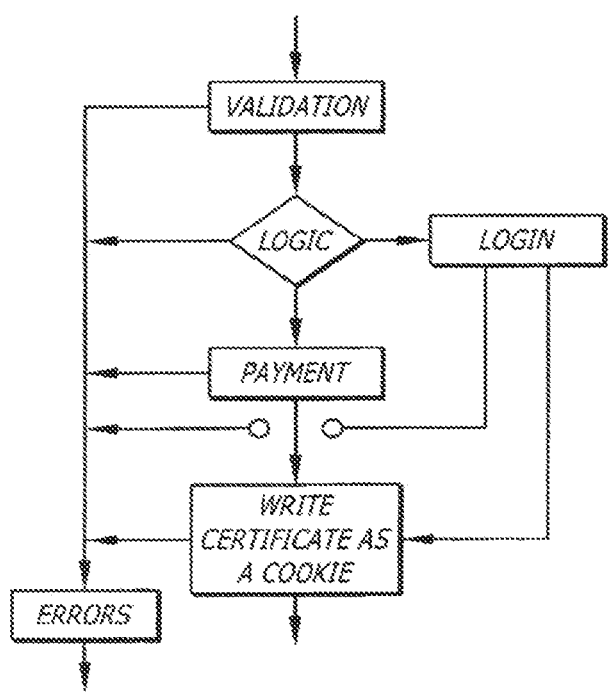
FIG. 5
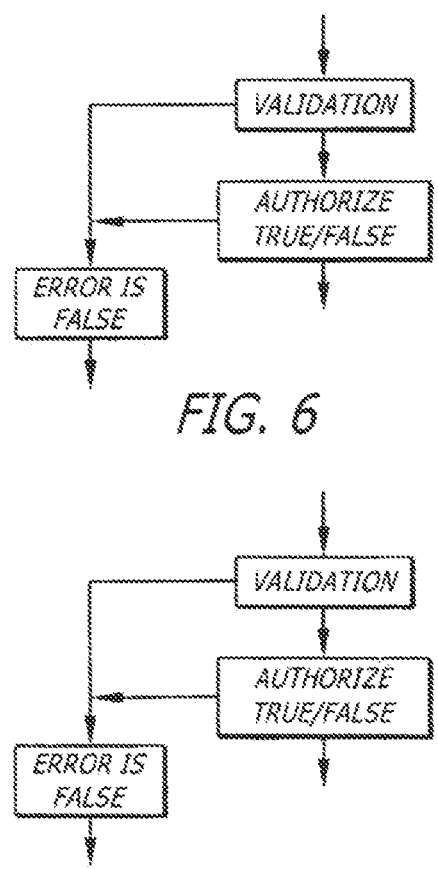
FIG. 6
FIG. 7

FIG. 29
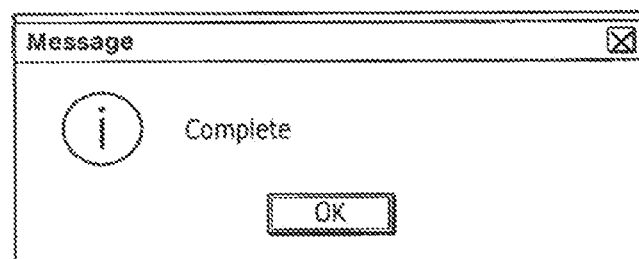
FIG. 30
FIG. 31
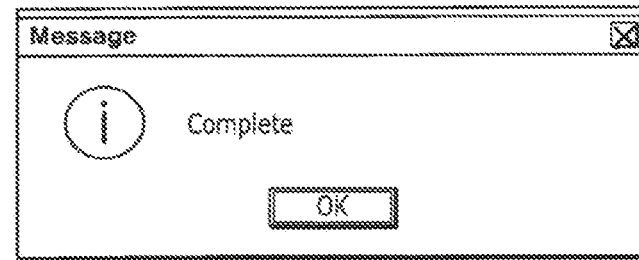
FIG. 32

SECURE AUTHENTICATION AND TRANSACTION SYSTEM AND METHOD

CROSS-REFERENCE TO RELATED APPLICATION

This application is claiming the benefit of co-pending utility application Ser. No. 14/797,160 filed on Jul. 12, 2015, which claimed the benefit of co-pending utility application Ser. No. 12/978,105 filed on Dec. 23, 2010, which claimed the benefit of co-pending utility application Ser. No. 11/544,302, filed on Oct. 6, 2006, which claimed the benefit of co-pending provisional application Ser. No. 60/724,691, filed on Oct. 7, 2005.

COPYRIGHTABLE SUBJECT MATTER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to security systems and methods, and more particularly, to a secure authentication and transaction system and method.

2. General Background and State of the Art

In a communications network such as the Internet, security issues arise in connection with remote authentication of users to web sites. Remote authentication is a bi-directional problem manifesting itself in several well-known attack profiles such as Phishing (a direct attack on the user), and brute force (an attack on the web site). All attacks are designed to gain access to an account or accounts without authorization. The fundamental challenge can be summarized as a failure to determine with complete accuracy if either end of the communication channel is successfully communicating with the correct entity.

Encryption techniques utilized to provide security include symmetric key encryption, where the same key encrypts and decrypts, and asymmetric key encryption, where one key encrypts and a different key decrypts. With a good asymmetric key encryption, it is difficult to get the decryption key even if the encryption key is known. Public Key Encryption is used to establish a secure connection. Assurance messages or images are m attempt at 2-way authentication such that users not only have to authenticate themselves to the site but the site authenticates itself to the users.

In a common way to authenticate users to a system, the user's public key has to be known to the server so a challenge phrase can be encrypted by the server using the client's public key. Only the real user will have the private key able to decrypt the message and respond. One Time Passwords (OTP) is another way to authenticate users. OTP is a hardware device that uses a random number generator to generate password at given intervals.

In the secure authentication and transaction system and method herein, a Client Token is directly connected to an Authentication Server, for enabling authentication of the Client and secure logins and transactions, in the background, while the Client Browser is connected to the Website. This eliminates the need for the Client to provide confidential personal and credit information to the Website, where security of such confidential information is at risk of interception and fraudulent use by fraudsters (persons committing fraud) and hackers. These fraudsters and hackers use techniques to acquire confidential information by launching effective malicious attacks, such as phishing, pharming, key-loggers, encryption-breaking, pass code-guessing, man-in-the-middle, SQL injection, and/or denial-of-service, all of which are attacks which are inhibited by the system and method herein.

An Authentication Server provides a means for secure web browsing and payment transaction between client and E-merchant. The authentication server acts as a trusted third party for storing client data such as log-on and credit card information. The system eliminates the need for a client to maintain numerous log-in parameters and to provide financial information directly to a web merchant.

Attacks on servers include SQL Injections, Brute Force-|Password Guessing, and DoS Attack. Attacks on Users include Phishing, Pharming, Key Loggers, and Cross-site scripting. Hybrid Attacks include Man In the Middle.

Terms Used in the Description of the Secure Authentication and Transaction System Application or Application Server—The application whereby users are logging into or the system is executing a transaction or transactions.

Authentication Server—The trusted system who authenticates both the Client and the Application (Web Site).

Client—Browser or browser like program.

Client Token—Token issued to the users.

SDK—Software Development Kit.

API—Application Programming Interface.

Integration or Integration server software—Instructions and commands that the Authentication Server will recognize and or respond to. Usually accomplished through an SDK or APL LDAP—Lightweight Directory Access Protocol Active Directory (AD)—AD is a directory services database, and LDAP is one of the protocols that can be used to communicate with it.

Connector—An architectural element that models interactions among components and provides rules that govern those interactions typically through an SOK or API.

Phishing is e-mail fraud. A fraudulent e-mail is sent as bait for a scam. It can be anything from a request to login to your account to buy an item at a wonderful low price, to a notification that you have won a free gift where you just have to pay for shipping. Reality is they just want your card numbers or login information or some other piece of information that can be used for profit. In its most popular form, it occurs when numerous accountholders receive an e-mail, allegedly sent by a financial institution, persuading them to supply private identifying personal and account information online. Phishing scams are one of the most rapidly growing forms of fraud on the Internet, and are the latest addition to the global identity theft epidemic. Phished is where a phony server displays a page that looks like the real one. Users can be easily fooled by this server and unwittingly give their (user name) and (token) to the wrong server. The wrong server or fraudsters can then login to the real site and take control. It is one time use only, because there is a time interval (attackers can only gain access to the accounts as they are Phished, not whenever they want).

Pharming is an attack on the DNS (Domain Name Server). Throughout the Internet, a series of domain name servers (DNS) quietly resolve the familiar addresses you type into specific Internet addresses. These servers are basically large directories of common names such as Amazon, Google, and Microsoft, and IP-specific addresses that you never see. For example, if you type www.cnet.com, this request goes to your nearest DNS server, which then locates the registered Internet address for the Web server at CNET Networks. It's much more convenient than always remembering 222.123.0.0 or something similar. However, this translation is also a weak link in the Internet's infrastructure. With every Internet request first bouncing off a DNS server somewhere on the planet, criminal hackers realized (some time ago) that rather than flooding a specific domain and effectively hiding it from the rest of the world (in what's known as a denial-of-service attack), they can either change the DNS record or take down the DNS system altogether. By making a phony site and changing the DNS record, a fraudster will not only fool the user, he/she will also fool your browser. If this is done to a financial institution or merchant site, fraudsters can get credit card numbers and personal information that can be used later on for identity theft.

Key-loggers are small programs that run in the background on your computer and capture every key stroke you make. With this kind of an attack a user can go to legitimate sites like their bank and/or merchant sites and the key-logger will record all of the user names, passwords, and card numbers used to login and make purchases. Verification services like Verified by VISA are rendered useless because everything that a user must type to verify themselves can be recorded by the key-logger.

Encryption braking—Fraudsters have generally taken the path of least resistance, and with all of the easy ways to get card numbers and or identity information, encryption braking is still a threat. Fraudsters have tools that can break outdated encryption algorithms. It only takes one clever hacker to write a program to break an encryption algorithm and then share it online. That is when an encryption algorithm becomes outdated.

Password guessing—Some sites are vulnerable to password guessing. Attempted solutions include locking out a user with too many failed attempts.

Trojan horse—Trojan horse attacks pose one of the most serious threats to computer security. According to legend, the Greeks won the Trojan War by hiding in a huge, hollow wooden horse to sneak into the fortified city of Troy. In today's computer world, a Trojan horse is defined as a malicious, security-breaking program that is disguised as something benign. For example, you download what appears to be a movie or music file, but when you click on it, you unleash a dangerous program that erases your disk, sends your credit card numbers and passwords to a stranger, or lets that stranger hijack your computer to commit illegal denial of service attacks.

Man in the middle—In cryptography, a man in the middle attack (MITM) is a type of attack where a user gets between the sender and receiver of information and sniffs any information being sent. In some cases users may be sending unencrypted data, which means a man-in-the-middle can easily obtain any unencrypted information. In other cases an attacker may be able to obtain the encrypted information from the attack, but have to de-encrypt the information before it can be read. A hacker can also be inline between B and C using a sniffing program to watch the conversation. This is known as a man-in-the-middle attack. A common component of such an attack is to execute a denial-of-service (DoS) attack against one end-point to stop it from responding. This attack can be either against the machine to force it to crash, or against the network connection to force heavy packet loss.

Session hijacking—TCP session hijacking is when a hacker takes over a TCP session between two machines. Since most authentications only occur at the start of a TCP session, this allows the hacker to gain access to a machine. A popular method is using source-routed IP packets. This allows a hacker at point A on the network to participate in a conversation between B and C by encouraging the IP packets to pass through its machine. If source-routing is turned off, the hacker can use blind hijacking, whereby it guesses the responses of the two machines. Thus, the hacker can send a command, but can never see the response. However, a common command would be to set a password allowing access from somewhere else on the Internet.

Hash Function—A hash function H is a transformation that takes a variable-size input m and returns a fixed-size string, which is called the hash value h (that is, $h=H(m)$). Hash functions with just this property have a variety of general computational uses, but when employed in cryptography the hash functions are usually chosen to have some additional properties. The basic requirements for a cryptographic hash function are:—The input can be of any length. The output has a fixed length. $H(x)$ is relatively easy to compute for any given x. $H(x)$ is one-way. $H(x)$ is collision-free. A hash function H is said to be one-way if it is hard to invert, where hard to invert means that given a hash value h, it is computationally unfeasible to find some input x such that $H(x)=h$. If, given a message x, it is computationally infeasible to find a message y not equal to x such that $H(x)=H(y)$ then H is said to be a weakly collision-free hash function. A strongly collision-free hash function H is one for which it is computationally infeasible to find any two messages x and y such that $H(x)=H(y)$. The hash value represents concisely the longer message or document from which it was computed.

Multiple Shiftkey Replacement (MSR) is an example of a patternless encryption and decryption system and method. Salt—Salt is a term used when talking about Hash Functions. Salt is a random string added to the message string before it is hashed. Although Hash Functions are one way and can't be reversed, an attacker can hash guessed messages and compare the hashed numbers to captured hashed number to get useful information. This kind of an attack is not feasible when salt is added. In the SuperCash system, the "Salt" is different for every transaction, making the hashed number unique for every transaction, making an attack useless anyway.

Small Key|Large Key Encryption—The Large Key is a standard MSR Key,—It includes random sets of replacement cipher text characters for each plain text character and a random set for the encoding Matrix and a random set for null or place holders so that the message will be in matrix sized chunks. The Small Key is a password that only the user should know. The Small Key affects the whole encryption process.

Token system—A current device that produces a predictable pseudo-random number in given intervals and the authenticating server produces the same pseudo-random number in the same intervals. A user is asked to give a (user name) and (the token) or pseudo-random number. The authenticating server compares the numbers to authenticate. The token device is expensive. The token device can be USB device. For a strong fraud preventing device the USB device should have its own processor like a smart card so that the Disk can't be copied or tampered with. For an economical device a standard medium can be used.

Cash files or one time cash files—Client information double encrypted, once using a hidden key on the Disk or PC, again using a password or PIN number known only to the user. Disk—Refers to any removable media. Client—Person or entity that wants to initiate a transaction. Fraudster—Person attempting to commit a fraud. Gateway—The system/server that is used to process transactions for merchants or other institutions like e-trade, check free, bill paying services, and the like. It also refers to system/server that is used for remote logins|authentication.

A version of a secure payment transaction system and method herein is referred to as "SuperCash," which is a system that can handle transactions from Credit, Debit or Prepaid accounts like VISA, MasterCard, American Express, Discover, check cards, gift cards, ATM cards basically customer to business or business to business. Another version of a secure check transaction system and method herein is referred to as "SuperCheck," which is a system that can handle transactions that are normally done with personal check, business checks, payroll, travelers checks, money orders, cashers checks, rebate checks or the like, with the ease of an e-mail. A further version of a secure authentication system and method herein is referred to as "SuperID," which is a system that allows a remote client to login securely.

Therefore, there has been identified a continuing need to provide a secure authentication and transaction system and method.

Invention Summary

Briefly, and in general terms, the present invention, in a preferred embodiment, by way of example, is directed to a secure user authentication system, operable over a client-server communications network to authenticate a system user. The system includes an application server, in the client-server communications network. The application server includes a site, wherein the site is able to be enabled to comprise an enabled application server site. The system further includes an authentication server, in the client-server communications network. The authentication server is able to enable the application server site to comprise the enabled application server site. The authentication server includes a core database, and which receives and stores user authentication-enabling data in the core database.

The system includes an authentication server, client tokens, and a means for the application to integrate to the authentication server. It includes a client, in the client-server communications network, and a client token, wherein the client token may comprise a program or an element which achieves the same or comparable results, which is able to be actuated in the client. The client token includes the user authentication-enabling data, and, upon actuation thereof, automatically directly connects to the authentication server, and sends the client authentication-enabling data to the authentication server, for secure user authentication by the authentication server. The client token does not send the user authentication-enabling data to the enabled application server site.

In accordance with the system, with respect to an API integration, a party may provide the API and another party may do the integration. The API dictates how things are communicated. If the application provides an SDK or API, then the system can integrate the authentication server to the application. This would add code to the authentication server so that it would communicate with the application. In such case the application provides the APL. This can be achieved if the application is big, is used by many companies, or issued by many users or developed by a big company.

Parameters of a version of the secure authentication and transaction system and method herein are as follows: with one way Hash Functions, the string to be Hashed includes information from the disk, the password or PIN, and Salt from authentication server. The encryption is unbreakable or as close to unbreakable as possible (MSR encryption and SHA-2 Hash Functions have this ability). An attacker is not able to get the plain text from the cipher text. The encryption is implemented so that each cipher text created is unique. The cipher text messages are one use only (MSR encryption has this ability). The only thing to distinguish cipher text produced by a particular key is the key serial number. An attacker who has collected many cash files is not be able to calculate or somehow get the encrypting Key. The encryption is implemented so that if a cash file is manipulated in any way the authentication is rejected. One-way Hash Functions will also work in place of encryption. The media is removable (e.g. a CD-ROM, USB device or Memory Stick). For practicality, the media may be compatible with legacy systems like magnetic strips and compatible with Personal Computers for e-commerce. The media should be upgradeable to accommodate future systems like RF-proximity.

In aspects of a version of the system, the secure payment transaction system and method includes New Disk designs which include: CD-ROM—as a payment device instead of standard credit card. Debit cards used online were only good for home use because full sized CD-ROM requires an install procedure. CD-ROM|Magnetic strip combination—a credit card sized CD-ROM required a carriage to fit in a standard CD-ROM Drive. The system herein uses a Card CD-ROM with a magnetic strip on the side. Advantage—no carriage needed to fit in a standard CD-ROM Drive. CD ROM|RF proximity chip combination, put a chip on a CD ROM. Advantage—no swipe is needed for fast checkout at a Point of Sale Terminal (P.O.S.T.) Because it is on a CD-ROM, it is compatible for home use on line (e-commerce). CD ROM|Magnetic strip|RF proximity chip combination—a chip and a magnetic strip on a CD ROM. USB device—as a payment device instead of a card—for a payment system. USB device|Magnetic strip combination—a magnetic strip and USB device together. USB device|RF proximity chip combination—an RF proximity chip in a USB device. USB device|Magnetic strip|RF proximity chip combination—a Magnetic strip, USB device and RF proximity chip together. Advantages—USB devices are compatible with personal computers so online usage is easy. Advantage with a magnetic strip—it is backwards compatible with magnetic swipe machines. Advantage—RF—proximity doesn't need to be swiped, so it is easy and fast at checkout (P.O.S.T.). PC—refers to any non-removable media like a hard drive. Based on one time cash files and direct communication it employs. Something you have (Disk) plus something you know (PIN). One time use only cash files. The cash files are sent directly to the authenticating server (fraudsters don't even get to see the one time cash file, let alone use it to get information or use it for anything).

User experience using SuperCash to make a transaction will be improved over current standards. Currently the user must trust that the site he/she is going to give their account information to is—Not going to get hacked into, Not share this information with other companies that might get hacked into, Not have an employee steal their information, Not share this information with other companies that might have an employee steal their information. Once the trust is there the user must—Fill out a billing address—Address 1, Address 2, City, State, Zip, Country. Select an account type (Visa/Master card/American Express . . . ). Fill out a sixteen digit credit card account number. Fill out the verification code on the back of the card. This is a lot of information to type out every time you want to make a transaction. This takes about nine steps. With SuperCash trust is not an issue because you do not give your account information to any merchant. With SuperCash, the user must—Insert the disk. Enter a Password or PIN. That is it. The SuperCash system is a two step process versus the nine step process currently used.

In other aspects of a system version, the secure check transaction system and method creates a cash file that can be saved to the hard drive or other media. The client can then upload the file to a merchant or e-mail to a friend or family member. The receiver can then login to their online banking and upload the received cash file. Merchants can automate this process and deposit the cash files received through a Gateway in real time. This system can be used with Check 21 or ACH systems. This system can be used instead of Check 21 or ACH . . . basically (customer to business) or (business to customer), or (business to business) or (customer to customer). Based on one time cash files it employs. Something you have (Disk) plus something you know (PIN). One time use only cash files. The cash files are made out to the receiver, and either uploaded to a site or e-mailed to the receiver. Generally the one time cash file from SuperChecks will be deposited fast, so if anyone got it, it would have been too late. Even if the fraudsters got the cash file before the receiver made the deposit they can't make the deposit because it was not made out to them.

In still other aspects of a system version, the secure authentication system and method, by using a SuperID system, is cheaper and more secure than a Token system. Token systems can be Phished, SuperID can't be Phished. Based on one time cash files and direct communication it employs. Something you have (Disk) plus something you know (PIN). One time use only cash files. The cash files are sent directly to the authenticating server (fraudsters don't even get to see the one time cash file).

The MSR Login System is a replacement for Tokens. Currently Tokens are used for secure remote Logins. The user is given a device that gives a predetermined set of random numbers. A new random number is displayed every 60 seconds on the device. The user goes to the site he/she wants to login to and enters a user name and the random number displayed on their token. (Something you know plus something you have) (This system is vulnerable to a Phishing or Pharming attack. An attacker can make a site look like the real one and for example send an email to the victim with a link to the phony site. The phony server will then capture the password and the one time 60 second random number and then login to the real site. Maybe the phony site will say to the victim that the site is down right now an to try back latter).

With the SuperID Login System the user goes to the site and the site writes a Cookie to the users PC. The SuperID program will then read the information in the cookie along with data on the disk and Password that only the user should know. The SuperID program will then encrypt the data and send a POST directly to the Server via an IP address not a URL. The SuperID Login System will authenticate the user. (SuperID is not vulnerable to a phishing attack. The user has to be on the real server in order to receive the cookies) What makes this system different from all of the other systems—It is easy to use (only a PIN to remember). No extra hardware (unlike smartcards). No extra software, Easy to implement. It can be implemented in JAVA making it cross platform compatible. Security—It will protect against Phishing, Pharming (DNS hijack) and Spoofing of all kinds. It will protect against phony Merchant fraud. The Clients will not be compromised if the merchants gets hacked into. It will protect against merchants from giving your card numbers to third parties.

In another aspect of a system version, the secure authentication and transaction system and method addresses the divergent needs and issues of a variety of players—payment networks, end users, card issuers, merchants, and processors. No changes to the Visa/MC system. The solution works within the given boundaries and confines of the existing transaction systems. Minimized consumer-facing security solution. Certifying to the MSR solution makes business sense to gateway processors, who take their cues from the payment networks. Processors generally utilize and follow what the payment networks create. Most of the gateway-generated solutions are back office transaction analysis-oriented. Gateways generally will not attempt to force a consumer-facing solution (Other Solutions have failed when they tried a consumer-facing security solution. Example: Verified by VISA). Card issuing banks see immediate benefits to the program, at minimal cost. Merchants would not be limited in their choice of a gateway service provider. The solution works alongside the current system to allow for a migration to the new system. Simplicity. Prevents transaction abandonment on the part of consumers due to confusion surrounding a checkout process change. End users would have a strong, demonstrated preference for a given solution to gain adoption. There are a variety of examples from the past, demonstrating that regardless of how easy the technology provider believes it is to use, consumers have a much lower threshold for usage and adoption.

In still further aspects of a system version, the secure authentication and transaction system and method prevents attacks, including Phony Phishing and Pharming sites are completely cut out of the loop for both the SuperCash and SuperID system. Phony sites are completely cut out of the loop for both the SuperCash and SuperID system even if the DNS servers have been compromised because SuperCash and SuperID systems use direct communication via an IP address bypassing the DNS servers. With the SuperCash and SuperID most of the information is never keyed in so a key-logger can only get a PIN. All of the authenticating information is completely hidden to a key-logger and to the user that is what makes it easy to use. The SuperCash and SuperID system makes use of either unbreakable encryption or one way hash functions.

The SuperCash system makes user of one way hash functions in conjunction with salt. With one way hash functions there is simply not enough data transmitted to reverse the process it can't be broken. One way hash functions can have "guessed strings" that will hash to the same number but the "guessed string" will not have any useful data. With SuperCash and SuperID an attacker cant even start a password guessing attack. With the SuperCash and SuperID systems the authenticating information is not installed nor does it reside on the computer it is stored on the disk itself. It won't stop you from getting a Trojan or stop the Trojan from doing damage to your computer but it will prevent the Trojan from getting any information from the SuperCash or Super:ID disk. With SuperCash there is only an authentication. The process is done after that. With the SuperID a command to set a password doesn't exist and the user authenticates with unique information each time this also helps prevent a Denial-Of-Service (DOS) attack.

These and other aspects and advantages of the invention will become apparent from the following detailed description and the accompanying drawings, which illustrate by way of example the features of the invention.

BRIEF DESCRIPTION OF THE DRAWINGS

FIG. 4 is a block diagram illustrating secure connection;

FIG. 5 is a flow chart of a request to the authentication server;

FIG. 6 is a flow chart of user authorization by the authentication server;

FIG. 7 is a flow chart of a response by the authentication server;

FIG. 29 is a screenshot of a client token window for entry of transaction data in the system;

FIG. 30 is a screenshot of the client token window after clicking the submit button where the transaction is complete;

FIG. 31 is a screenshot of a client token window for entry of transaction data in the system;

FIG. 32 is a screenshot of the client token window after clicking the submit button where the transaction is complete;

FIG. 37 is a screenshot of a client token window for entry of recurring charges transaction data in the system;

FIG. 38 is a screenshot of a client token window for entry of recurring charges transaction data in the system;

DETAILED DESCRIPTION OF THE PREFERRED EMBODIMENTS

Figure 1:
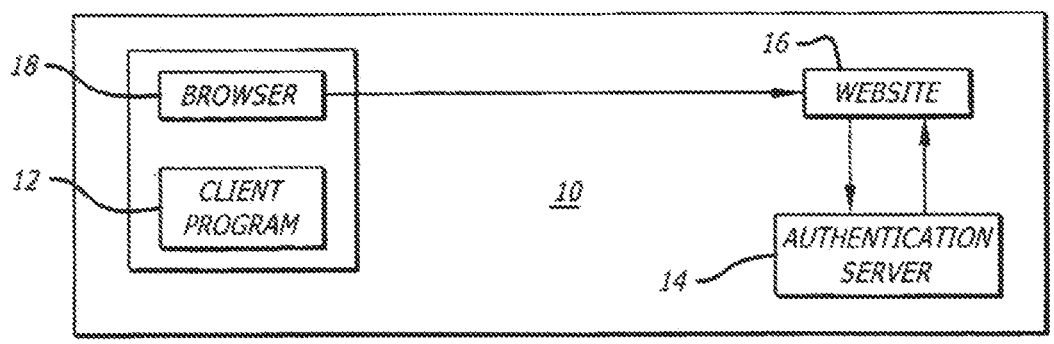
FIG. 1 is a block diagram illustrating login in a secure authentication and transaction system.
Figure 2:
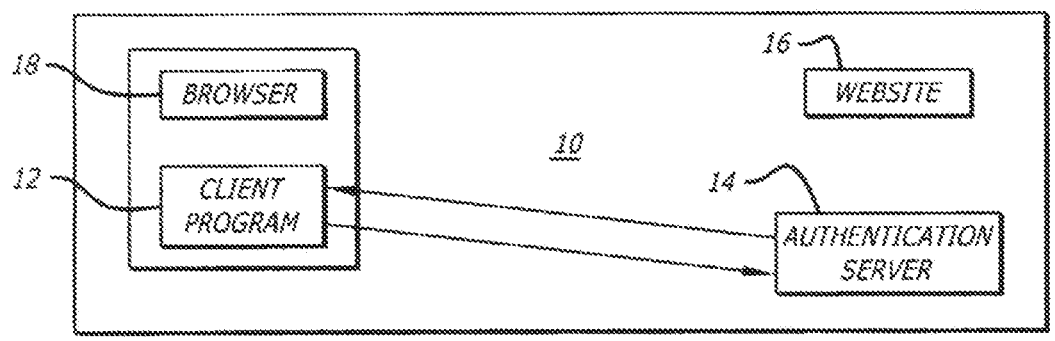
FIG. 2 is a block diagram illustrating redirection for authentication in the system.
Figure 3:
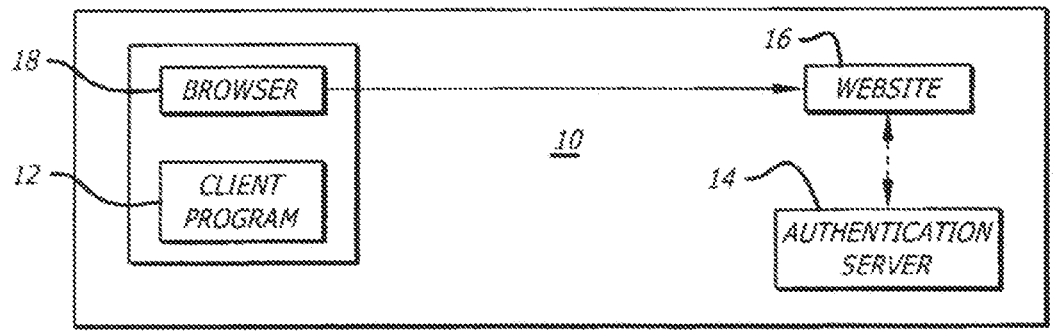
FIG. 3 is a block diagram illustrating checking an authentication.
Figure 8:
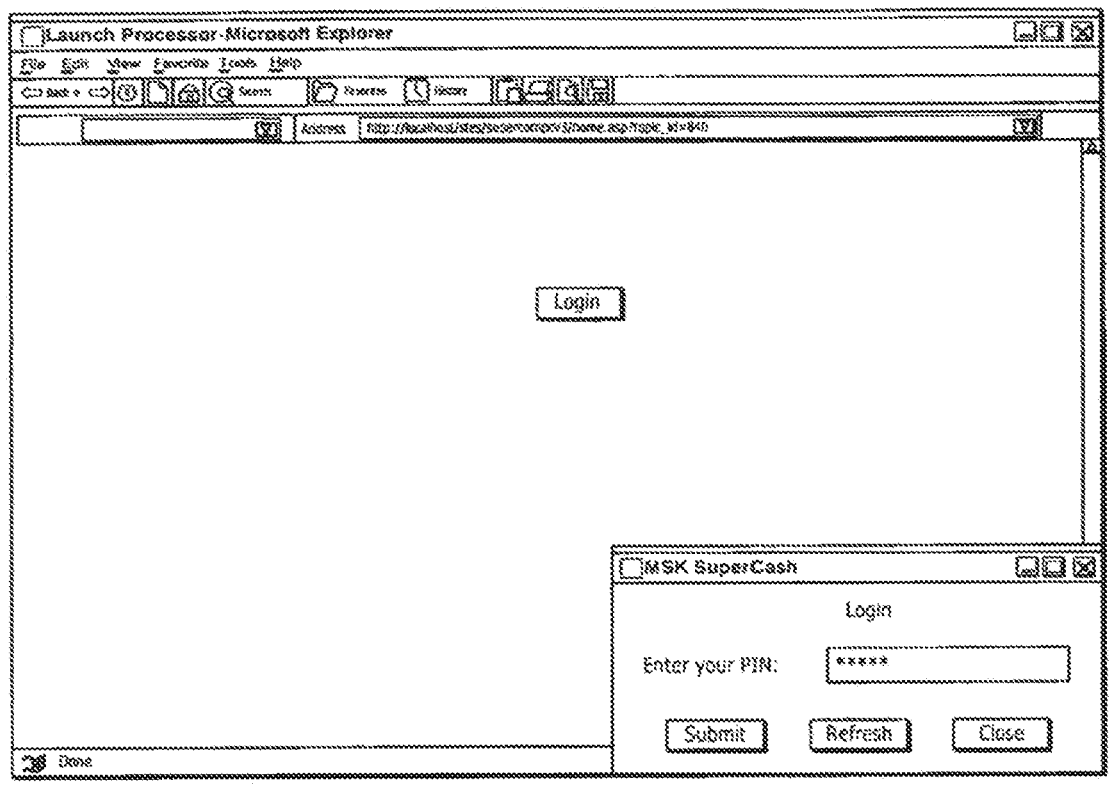
FIG. 8 is a screen shot of an application server site, including a client token window in a version of the system.
Figure 9:
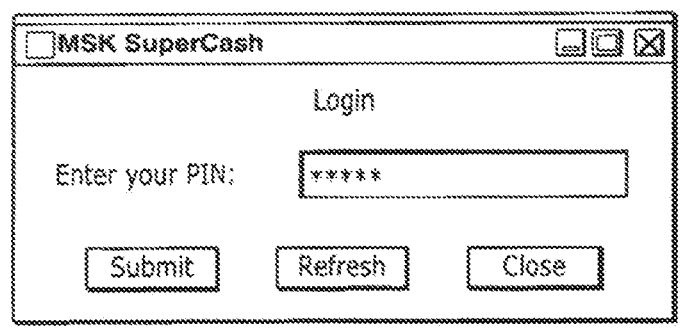
FIG. 9 is a screen shot of the client program window.
Figure 10:
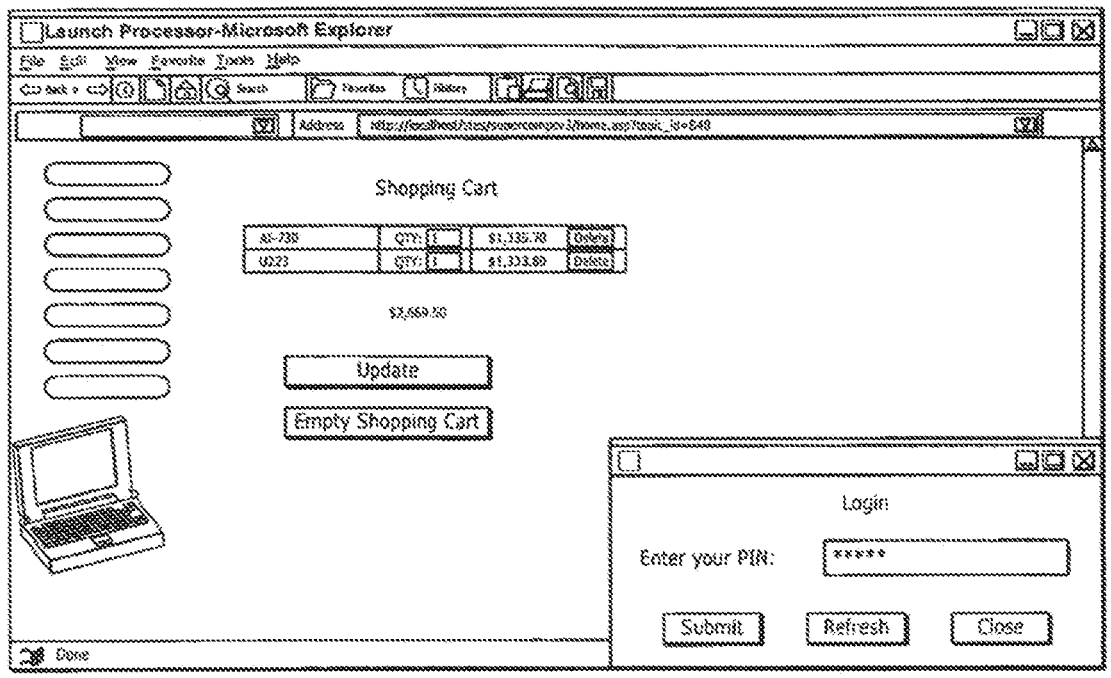
FIG. 10 is a screen shot of the shopping cart page of the application server site including the client token window in a version of the system.
Figure 11:
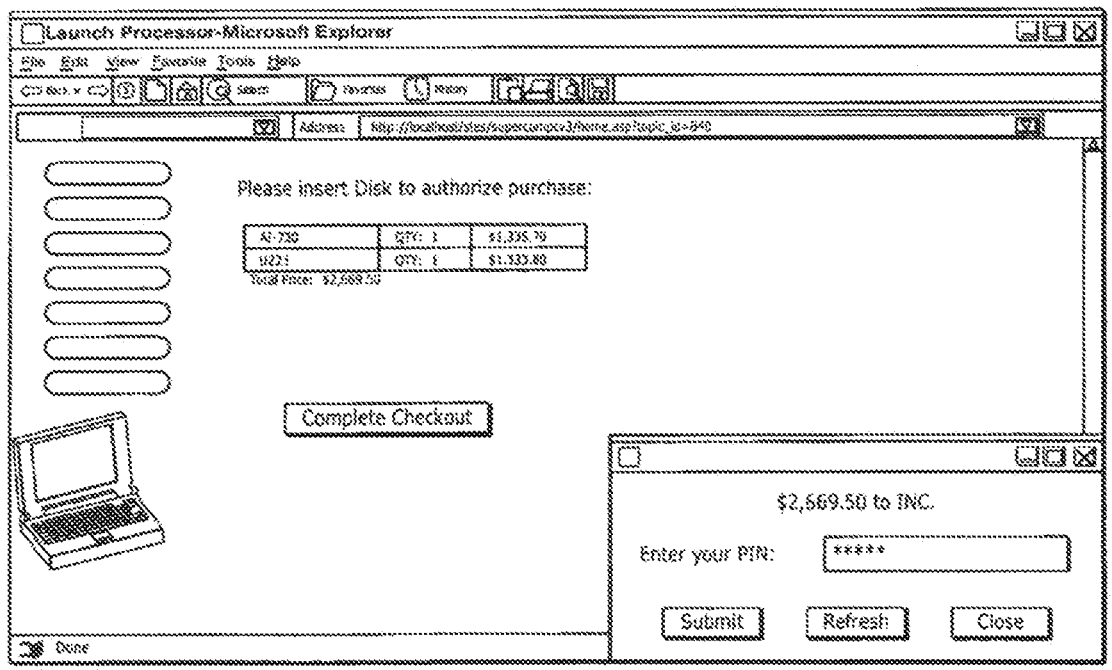
FIG. 11 is a screen shot of the checkout page of the application server site, including the client token window.
Figure 12:
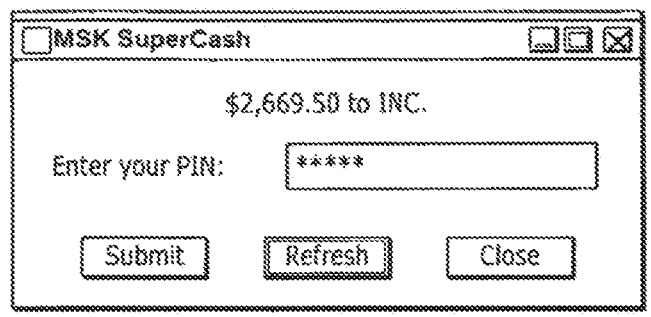
FIG. 12 is a screen shot of the client token window displaying a transaction amount and website owner.
Figure 13:
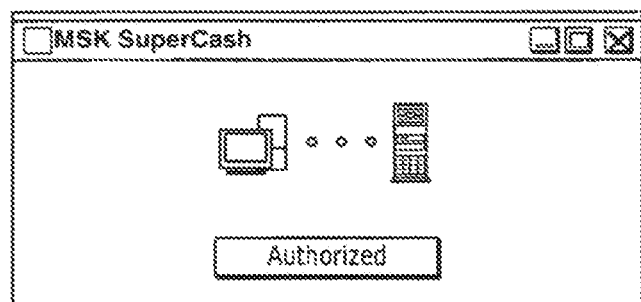
FIG. 13 is a screen shot of the client token window after clicking the submit button, where the transaction has been authorized.
Figure 14:
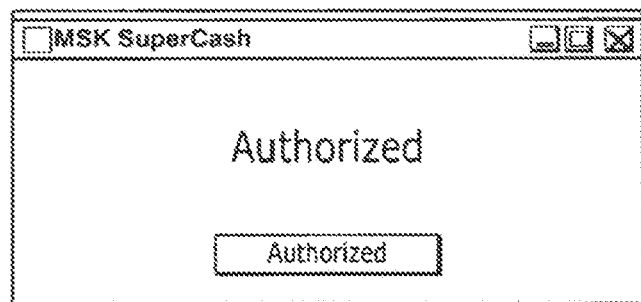
FIG. 14 is a screen shot of the client token window upon completion of the transaction where the transaction has been authorized.
Figure 15:
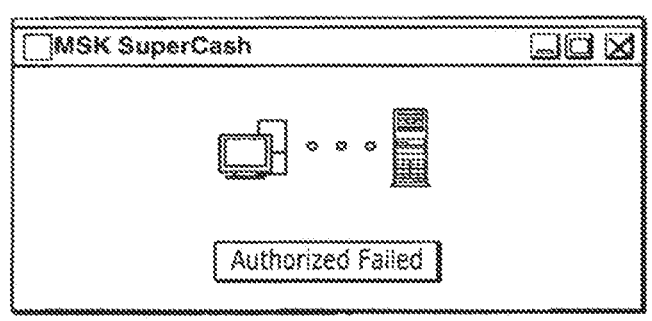
FIG. 15 is a screen shot of the client token window, upon clicking the submit button, where authorization has failed.
Figure 16:
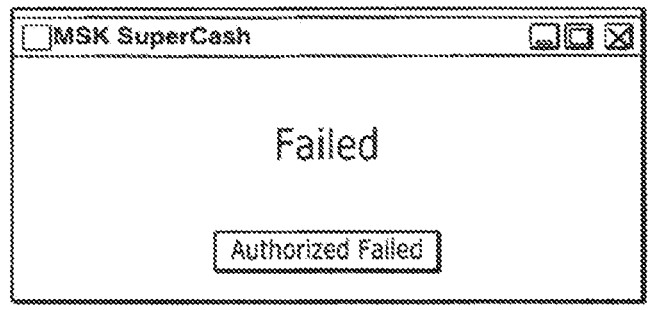
FIG. 16 is a screen shot of the client token window, upon completion of the transaction, where authorization has failed

The system according to the invention includes a system 10, as illustrated in FIGS. 1-3, for conducting secure authentication and secure transactions over a communications network such as the Internet.

The system 10, for example, includes a Client Token 12, wherein the Client Token 12 may comprise a program or an element which achieves the same or comparable results, which may be on media such as a CD-ROM, or may be downloadable, or may be otherwise provided, an Authentication Server 14, a Client Pass Code, which is used in conjunction with the Client Token 12, and an Enabled Website 16.

The Client is the person to whom the Client Token 12 has been issued.

The Client Program 12 is directly linked to the Authentication Server 14, and is issued by the implementer of the Authentication Server 14. The Client Program 12 has the following features: (1) it is designed to auto-run once opened on the computer or inserted into a disk reader; (2) it has a Serial Number embedded in it; (3) it includes an Account Number which is unique and identifies the Client; (4) it has a Label to enable the Website 16 and to enable the activity that the client is undertaking; (5) it has the Authentication Server IP address, which specifies the issuing Authentication Server for this specific Client Program.

The Authentication Server is a server which authenticates Clients and application servers (such as Websites) to each other. Through the Authentication Server, Clients authenticate themselves to the Authentication Server, servers authenticate themselves to the Authentication Server, and the Authentication Server authenticates each Client and server to each other. The Authentication Server includes a core database which it uses to match up Clients and servers. The Authentication Server core database has a series of attributes, including, for Clients, data regarding the client, (e.g. name and password) to which any client information can be attached (e.g. first name, last name, address etc.), and for servers, the Website signature, as registered by the Website with the Authentication Server, which can be attached (e.g. the Website name, and for transactions, where the money is going, to whom and for what). The Authentication Server directly connects the Client Token thereto, automatically, in the background.

The Pass Code is selected by the Client, and is only known to the Client and the Authentication Server 14. It has substantially no limits on the size (length) of the Pass Code, or on the type of characters that can be utilized, (e.g. "Mary had a little lamb,!@#$%"&*"( )") except for operators such as the word "enter".

The Website 16 is registered with the Authentication Server, and is enabled by being modified to provide a "Login" button in place of the traditional "username"/ "password" fields. The underlying Login function is modified to provide a secure request to the Authentication Server 14, so as to confirm the validity of the Client credentials, which replaces the normal SQL access to the database.

In general, when the Client arrives at the Website 16, the system runs, and the Client validates the web credentials in the system and enters the Client Pass Code. The system validates the Client and allows access to the website once the Login button has been pressed.

For the Login process, as seen in FIG. 1, when the Client wishes to Login to the Website 16, the Client Browser 18 connects the Client to the Website 16. In the background, hidden to the Client, when the Client Browser 18 is ready to go the login page of the Website 16, the Client Browser 18 is redirected to the Authentication Server 14, as seen in FIG. 2, and the Authentication Server 14 redirects back to the Login page on the Website 16. The Authentication Server 14 receives a server ID number field from the Website 16, so that it knows where to redirect back to, which includes information about the type of transaction being performed (either Login or Payment). The Authentication Server 14 writes a rookie to the Browser 18, and the Client Token 12 reads the cookie of the Browser 18, with a unique Certificate and Label embedded in it, and sets the status of the Login as "pending". The Authentication Server 14 redirects the Client back to the Login page on the Website 16 and POSTS the same Certificate to the Website 16.

At this point, nothing can happen until the Client Token 12, running on the Client's computer, reads the Cookie, and the Client enters the Pass Code by hitting a "submit" button which passes the Login request through.

When the Client Program 12 is run, as shown in FIG. 2, it reads the Cookie and extracts the Certificate. This is combined with the Serial Number and Pass Code, and run through a one-time Hash. The Hash is a transformation function, which takes a variable-size input and returns a fixed-size string, a one-way function which is impossible to invert to find the underlying input, and which is collision-free in that it is computationally not feasible to find any two inputs with the same resulting Hash. The inputs to be hashed herein are the Certificate, Serial Number, and Pass Code, resulting in the Hash output. The Hash output, the Certificate, and the Account Number are sent directly from the Client Program 12 to the Authentication Server 14 using the embedded IP address of the Authentication Server 14, which is hard coded in the Client Program 12 and cannot be changed.

Once the Authentication Server 14 has received the Hash, the Certificate, and the Account Number, it performs the same hash process, using the Pass Code it has in its database, the Serial Number, and the issued Certificate. If the Hash output at the Authentication Server 14 matches the Hash output sent to it from the Client Token 12, the Client is authenticated, the Authentication Server 14 responds back to the Client, and the Certificate is set to "active". The Client has now received an "authenticated" message back from the Authentication Server 14. The Client is now free to click on the "Login" button on the Website 16.

When the user hits the Login button, as in FIG. 3, the Web site 16 asks the Authenticating Server 14 to check to see if the Client has been authenticated as either "active" or "failed", and the Certificate expires.

The Website 16 and the Authentication Server 12, as illustrated in FIG. 4, are connected to each other through a secure connection 20, for example through a trusted Isolated Local Area Network (LAN), or alternatively through a Secure Socket Layer (SSL) or a Virtual Private Network (VPN), and are connected to the Web 22 for example through Firewalls 24 and a Proxy Server 26. If the authentication is acknowledged as "active", then the Website 16 lets the Client in. Once the Website 16 has received an authentication acknowledgement as "active", any rights associated with the Client are assigned.

The Payment operation is the same as the above Login process, with the addition of fields that are transferred between the Website 16 and the Authentication Server 14, as illustrated in FIGS. 1-3. The Client is identified by a similar mechanism to the login process, but in addition the Authenticating Server 14 passes stored credit card information to a Payment Gateway which leads to the banking payment transaction network and returns "active" or "failed" to the Website 16.

The Client checks out by clicking the account type to pay with, e.g. Visa, Master Card, AMEX. A merchant will display only the types they accept. The Website 16 will redirect to the Authentication Server 14. The Authentication Server 14 will write a Certificate and a Label to a Cookie and redirect to the Client to complete the transaction page on the Website 16. On the redirect the Authentication Server 14 will POST the same Certificate to the Website 16.

During the redirection, the information supplied by the Website 16 is customizable, for example as follows: name of the item being purchased—the short name; product ID— normally SKU number; quantity being purchased; description of the product—the long description; unit price; total amount; shipping address for this order; and address fields for: city; state; zip code; country.

The Authentication Server 14 responds in a similar manner to the login mechanism and issues a Certificate to the Client Program and the Website 16. In addition, a tracking value is also returned.

The system extracts information from the Cookie to display (independent from the Website 16) the payment amount and who it is to be sent to. This allows the Client to know exactly what is going on. This process will be tailored to the requirements of individual merchants on a case-by-case basis The system of the invention, as seen in FIGS. 1-4, comprises a secure user authentication system, operable over a client-server communications network to authenticate a system user. It includes an application server, in the client-server communications network, which includes a site, wherein the site is able to be enabled to comprise an enabled application server site, and an authentication server, in the client-server communications network, which is able to enable the application server site to comprise the enabled application server site. The authentication server includes a core database, and receives and stores user authentication-enabling data in the core database. The system further includes a client, in the client-server communications network and a client token, wherein the client token may comprise a program or an element which achieves the same or comparable results, which is able to be actuated in the client, which includes the user authentication-enabling data, and which, upon actuation thereof, automatically directly connects to the authentication server and sends the client authentication-enabling data to the authentication server for secure user authentication by the authentication server, and which does not send the user authentication-enabling data to the enabled application server site.

The application server is further able to redirect the user to the authentication server for secure user authentication by the authentication server.

The client-server communications network may comprise the Internet. In such a network, the authentication server includes an Internet Protocol address which specifies the authentication server which issued the client token, and the client token includes the authentication server Internet Protocol address. The Internet Protocol Address of the authentication server embedded in the client token is hard coded and unchangeable in the client token. The application server site in such network comprises an Internet application server website.

The application server site includes a login button, the authentication server, independent of actuation of the login button, authenticates the user, for secure user authentication, and, upon actuation of the login button by the user, the application server checks with the authentication server for secure user authentication by the authentication server. The enabled application server site does not provide for entry by the user of a username and password for user authentication.

The client token enables a passcode selected by the user to be entered thereinto, and the user authentication-enabling data, received and stored in the authentication server core database, includes the user-selected passcode. The client token enables the passcode selected by the user to be of substantially any length and to include substantially any type of character.

The enabled application server site comprises an application server site which is registered with the authentication server.

The client further includes a client browser program. The client browser program, upon activation thereof, connects the user to the enabled application server site, and the authentication server securely authenticates the user while the client browser program is connected to the enabled application server site. The application server site includes a server identification number field which the authentication server receives from the application server site accessed by the client browser program, so that the authentication server knows where to redirect back to, and which includes data regarding the type of transaction being performed.

The enabled application server site checks with the authentication server to determine secure use authentication.

The client token includes a serial number embedded therein, and the client authentication-enabling data includes the client token embedded serial number.

The client token includes an account number which is unique and which identifies the user, and the client authentication-enabling data includes the client program account number.

The client token includes a label which verifies the enabled application server site, and which enables the activity that the user in undertaking. The client further includes a client browser program, and the authentication server is able to write a cookie to the client browser program, which cookie includes the label, and a unique certificate, embedded in the cookie. The client token, upon activation thereof, reads the authentication server cookie and extracts the certificate, and runs the combined certificate, serial number, and passcode through a one-time hash, generating a client token hash output. The client token, upon activation thereof, uses the embedded Internet Protocol address cookie of the authentication server to send the client token hash output directly to the authentication server.

The authentication server, upon receipt of the client token hash output, the certificate and the account number from the client token, performs the same hash process as was performed by the client token, using the passcode in the authentication core database, the serial number, and the certificate to generate an authentication server hash output. The authentication server, upon the user actuating the login button, checks the client token hash output against the authentication server hash output, to determine whether the user has been authenticated, and, depending upon whether there is a match or there is no match, sets the certificate to either "active" or "failed" responsive thereto, the application server requests the authentication server to advise whether the certificate has been set to "active" or "failed", and upon the request from the application server the certificate expires. The authentication server se the certificate to "active", any rights associated with the user are assigned to the user by the application server site The authentication server is able to authenticate the client and the application server to each other. The authentication server is able to authenticate the user, the application server, and the user to the application server.

The authentication server core database is able to authenticate the user, and pushes the user account number to the application server.

The authentication server site core database includes attributes for the user and for the application server.

As illustrated in FIGS. 1-4, for logins or transactions, when a user attempts to navigate to the login page, the Website will redirect to the MSK Authentication Server (Auth Server). The Auth Server will write a Certificate and a Label to a cookie, and redirect to the user to the login page on the website. On the redirect the Auth Server will POST the same Certificate to the website.

The user will enter a Passcode (Passcode is known only to the user and has substantially no limits on the kind of characters that can be entered (i.e. {"Mary had a little lamb!@#$%"&*"0)"}). The user will either hit the enter key or mouse click the Submit button and the MSK Client will respond with either Authorized or Failed.

The user can now login to the website by clicking the Login button on the website or complete the transaction by clicking the complete payment button on the site. The website will connect MSK Authentication Server through either SSL, VPN or through a trusted Isolated LAN connection to check if the user has been authenticated.

For transactions, the user checks out by clicking on the account type he/she want to pay with i.e. Visa, Master Card, AMEX . . . Note: a merchant will display only the types they accept. Website will redirect to the MSK Authentication Server (Auth Server). The Auth Server will write a Certificate and a Label to a cookie and redirect to the user to complete transaction page on the website. On the redirect the Auth Server will POST the same Certificate to the website.

The client starts by shopping online. Once the client is finished shopping like normal he/she will be directed to either a payment Gateway or in house Checkout page. If the SuperCash system is used as a payment method, the merchant will POST its merchant ID, the client will be redirected to the SuperCash System, and back to the merchant. This process is seamless—the average user will not even notice that they had left the merchants site. Either the merchant or SuperCash system can give the client instructions to insert their SuperCash Disk. The program will read the "Tracking Number" and "Salt" written to cookies by the SuperCash server. The program will also read the card number and other card information from the disk. The SuperCash Program will also read the PIN entered by the client. (The only thing the client has to do is insert the disk and enter a PIN). The SuperCash Program will send the Cash File directly to the SuperCash Server via IP address, not URL. This will prevent Pharming attacks.

The first line in the Cash File starts with the card number, next line is the tracking number, last line is the Hashed number. The Card number will fill the standard card number required by (VISA, Master Card, American Express, etc . . . ). The tracking number and hashed number are on the Extra fields making the SuperCash system compatible with the current system. The string that is hashed is the card information plus the "Salt" and the PIN. The salt is random and unique every time, making the hash unique or one time only. Once the program sends the Cash File directly to the SuperCash server, the transaction is sent on to VISA, Master Card, etc . . . like normal to be completed. The client then clicks the Complete Transaction button to confirm that he/she has been approved.

What the client sees: The client shops online. On the checkout the client will be asked to insert the disk. The program on the disk will ask for the PIN. Once submitted the program will indicate when it's done. The "Complete Transaction" button is clicked to confirm that the client is done. The merchant will be sent either an approved or denied message for the client to see.

What the merchant sees: The user shop onsite normally. On checkout they are re-directed to the SuperCash Server and the merchant ID is Posted to the System. The merchant can also send an itemization of what was bought along with descriptions and prices. The user is re-directed right back to a page on your site with the "Complete Transaction" button on it. They click it and the merchant is sent either an approval or denial.

What (VISA, Master Card, etc . . . ) sees: Card numbers in the correct field, a tracking number, the Salt string and hash number in three of the extra fields. That's it.

What the banks see: New cards are issued to their customers. When customers use the disk, they will receive from (VISA, Master Card, etc . . . ) the card number, the tracking number, the salt string and the hash number. The string can then be put together and run a hash on it and compare to authenticate. The results are that they won't have the cost of online fraud or the inconvenience to their customers. Their customer will feel safe shopping online.

In the secure transaction system and method, the Payment File includes the following: Card details—Label, Key file name, Card number (part of the string to be hashed), Card Type (VISA, Master Card, etc . . . ) (part of the string to be hashed), Expiration Date (part of the string to be hashed), Card number displayed in plain text, First Name, Last Name, Address 1, Address 2, City, State, Zip. User Input—PIN, Submit button. From Cookie information written by Super-Cash Server—Tracking Number, Salt.

In the secure authentication system and method, the Payment File includes the following herein: Cash File details for SuperID,—Label. Key file name. Extra field left over from SuperCash. Cookie name. Full address to send Cash File (IP not URL). This will prevent Pharming attacks. User ID displayed in plain text. From Disk file cardinfo. data—First Name, Last Name, Address 1, Address 2, City, State, Zip. User Input—PIN, Submit button. From Cookie information written by Remote Server—Tracking Number, Salt (optional only if you use Hash Functions instead of encryption like MSR).

Figure 27:
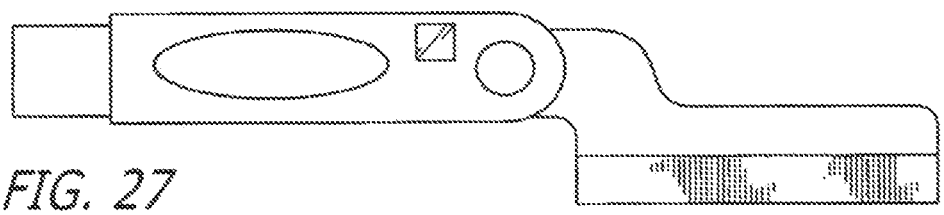
FIG. 27 is an elevational view of a version of a device including a client program for a secure authorization and transaction system.
Figure 28:
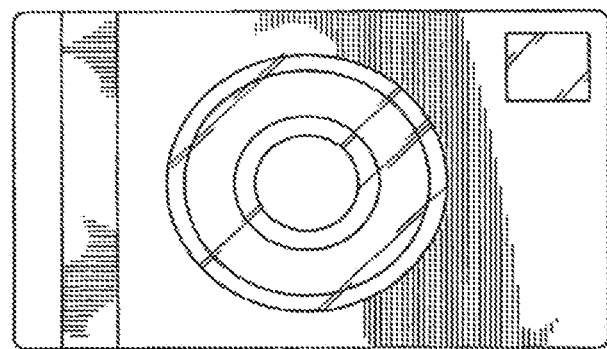
FIG. 28 is an elevational view of another version of a device including a client token for the system.

Referring to FIGS. 27-28, a first type of device for the secure authentication and transaction system is shown in FIG. 27, and a second type of device for the secure authentication and transaction system is shown in FIG. 28. In. FIG. 27, a USB|Magnetic Strip|RF proximity chip device is shown, which is a first type of authentication and payment device for a secure authentication and transaction system as described herein. In FIG. 28, a CD ROM|Magnetic Strip|RF proximity chip device is shown, which is a second type of authentication and payment device for a secure authentication and transaction system as described herein. The first and second types of authentication and payment devices are also referred to herein as the authentication device and the payment device.

To use the first version of a secure payment transaction system, as shown in FIGS. 29-30, input the payment for device, select an account to pay from, enter the Dollar Amount, enter your PIN and confirm it, click the "Submit" button, click "ok" and you are done. This version is an example where the ID and Payment System (SuperCash/SuperID) are merged together in the same program.

For use of a first version of a secure authentication system, as seen in FIGS. 31-32, input the payment device, select login, enter PIN and Confirm, click Submit, click "ok," and you are done.

Figure 33:
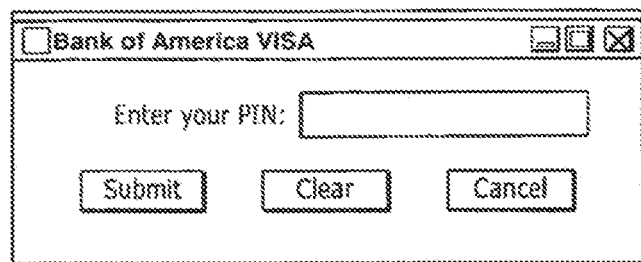
FIG. 33 is a screenshot of a client token window for entry of transaction data in the system.
Figure 34:
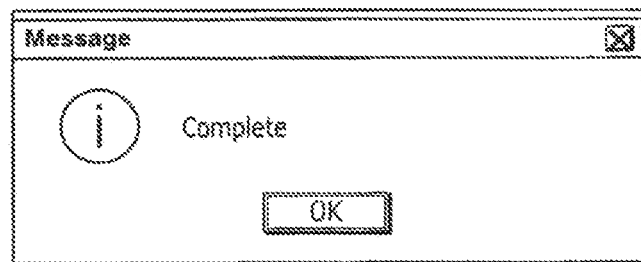
FIG. 34 is a screenshot of the client token window after clicking the submit button where the transaction is complete.

In a second version of a secure payment transaction system, as referred to in FIGS. 33-34, input the payment device, enter your PIN, click the Submit button, the Complete window appears, and you are done. This is an example of using a second version of SuperCash. Just insert the disk and enter the PIN number and you are done.

Figure 35:
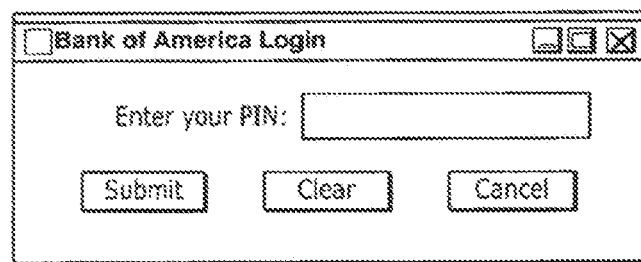
FIG. 35 is a screenshot of a client token window for entry of transaction data in the system.
Figure 36:
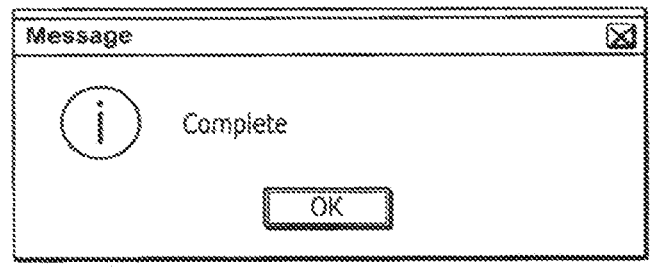
FIG. 36 is a screenshot of the client token window after clicking the submit button where the transaction is complete.

In a second version of a secure authentication system, as referred to in FIGS. 35-36, input the payment device, enter your PIN, click the Submit button, the Complete window appears, and you are done. This is an example of using a second version of SuperID. Just insert the disk and enter the PIN number and you are done. This version is an example where the ID and Payment System (SuperCash/SuperID) are separated.

Figures 37, 38:
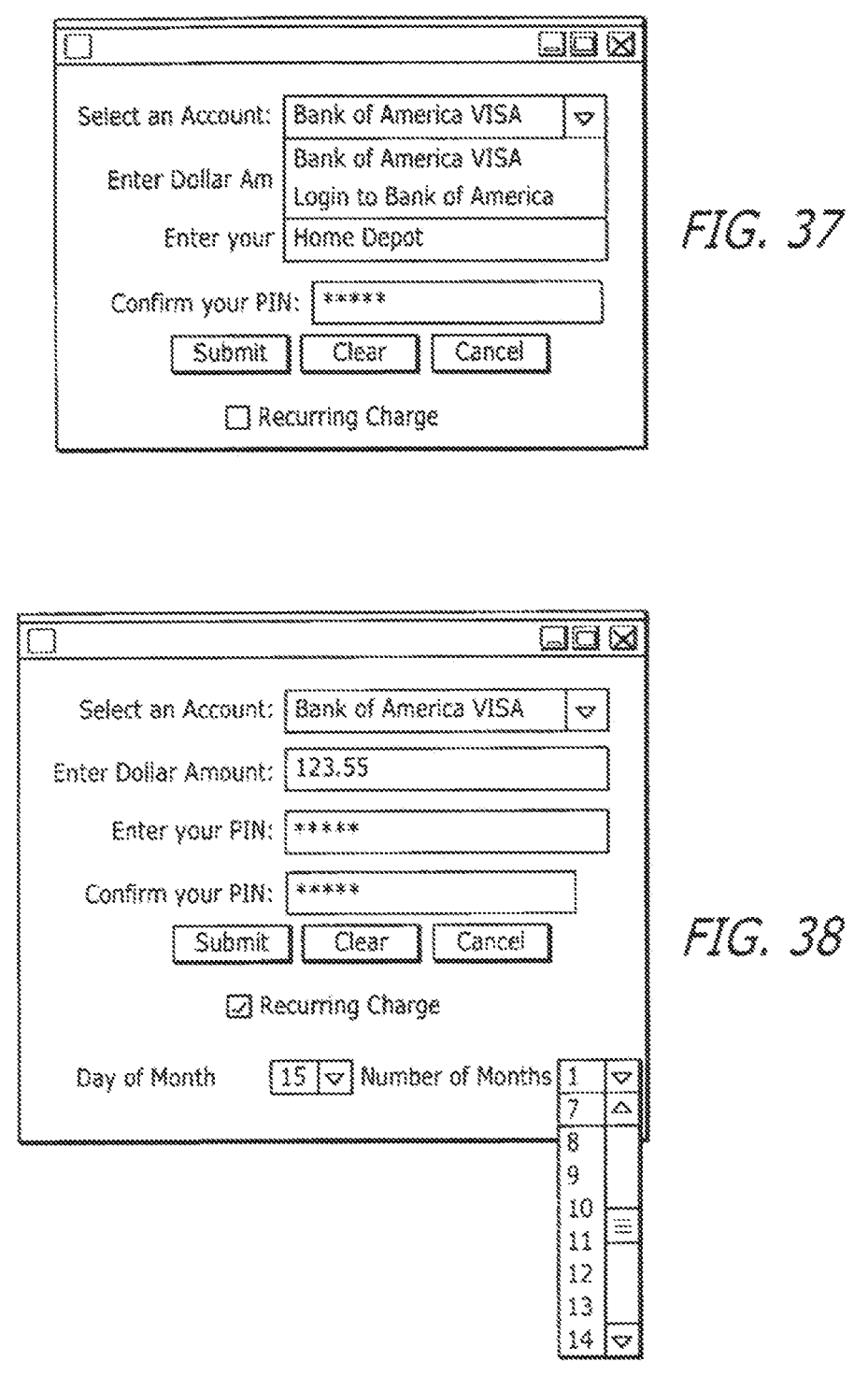

Referring to FIG. 37, there is shown a recurring charges capability In this example you check the box labeled Recurring Charge, then pick the day of the month you want to be charged, and how many months you want to be charged. This capability will be good for services like AOL or Netflix. The simple version is capable of having recurring charges, you just don't have the upfront control because it assumes how much, how many times and when you are going to be charged is disclosed properly.

As shown in FIG. 38, in the above recurring charges example, the charges are $123.55 on the 15th of the month for 12 months or one year. Charges will be made to Bank of America VISA. What the gateway needs—Merchant ID issued by merchant bank, usually it's the account number, and Terminal ID—issued by merchant bank, similar to POS (Point Of Sale) station.

Figure 39:
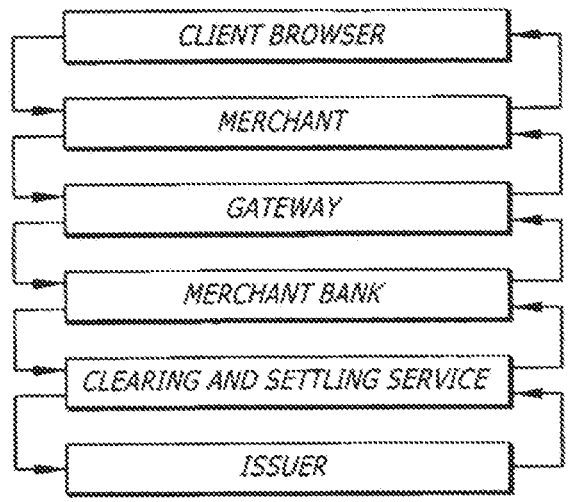
FIG. 39 is a flow chart of a current transaction system.

As seen in FIG. 39, a current system different from the system herein in that the current system functions as follows to enable the user to shop online: Merchant sends authorization request to Gateway. Gateway sends authorization request to Merchant Bank. Merchant Bank sends authorization request to their Clearing and Settling Service. Clearing and Settling Service sends authorization to Issuer. The Issuer approves or declines authorization, and forwards the authorization to the Clearing and Settling Service. Clearing and Settling Service forwards the authorization to the Merchant Bank. Merchant Bank forwards the authorization to the Gateway. Gateway forwards the authorization to the Merchant. Merchant indicates to user that payment was approved or denied.

Figure 40:
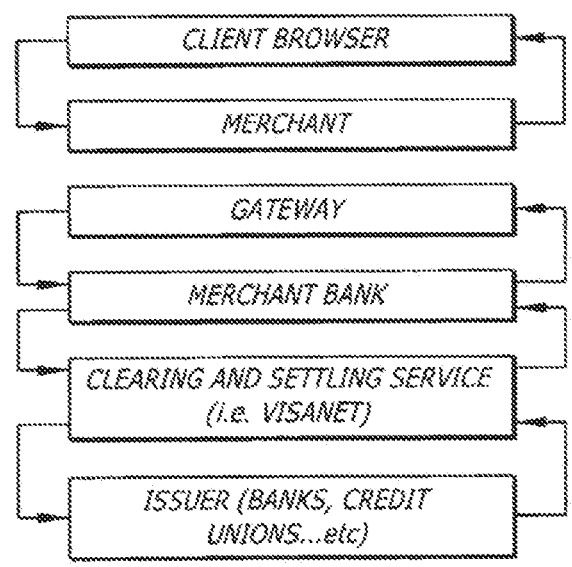
FIG. 40 is a flow chart of a current transaction system.

As illustrated in FIG. 40, the above current system enables fraud to be committed by enabling the client to shop online. Fraudster web sites capture Card Numbers including security numbers like the Card Verification Value 2, by SPAM, Phishing, Pharming etc. Indicate to the user that the transaction did not go through, or that the system is down, or whatever they want, because they just stole the Credit Card number.

Figure 41:
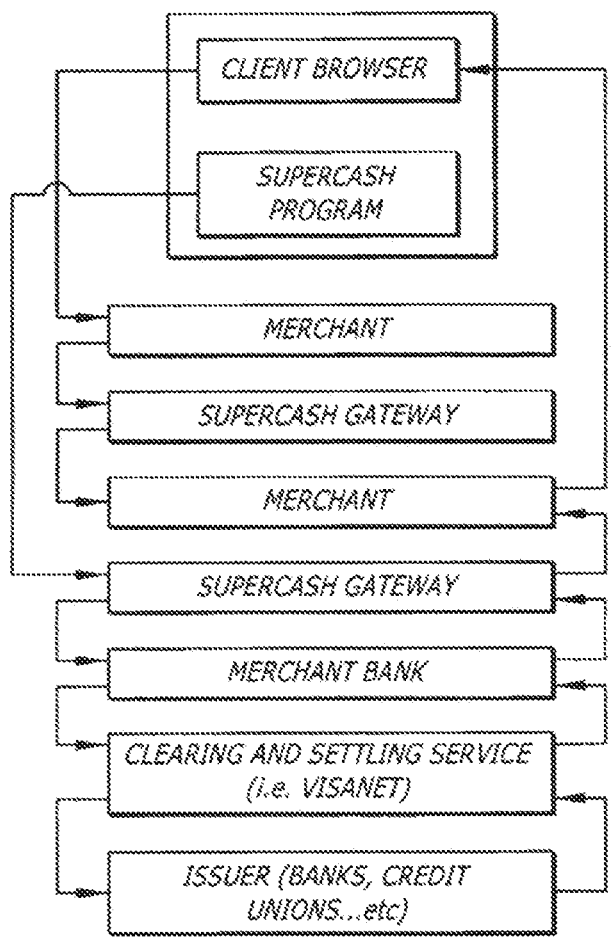
FIG. 41 is a flow chart of a payment system in the secure authorization and transaction system herein.

In the first version of the payment system herein, as seen in FIG. 41, input the payment device, and the client shops online. On checkout, client is re-directed seamlessly to SuperCash Gateway and back to the Merchant. SuperCash Program sends Cash File directly to SuperCash Gateway. SuperCash Gateway sends authorization request to Merchant Bank. Merchant Bank sends authorization request to their Clearing and Settling Service. Clearing and Settling Service sends authorization to Issuer. The Issuer approves or declines authorization and forwards the authorization to the Clearing and Settling Service. Clearing and Settling Service forwards the authorization to the Merchant Bank. Merchant Bank forwards the authorization to the Gateway. Gateway forwards the authorization to the Merchant. Merchant indicates to user that payment was approved or denied.

Figure 17:
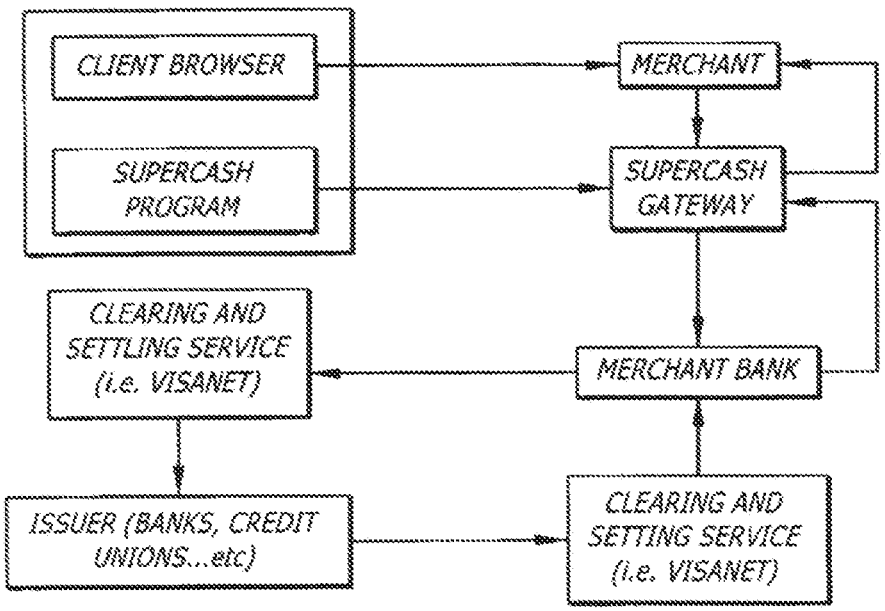
FIG. 17 is a flow chart of a version of a payment system in the secure authentication and transaction system.

In the second version of the payment system herein, as seen in FIG. 17, input the payment device, and the user shops online. On checkout, user is redirected to the SuperCash Gateway. SuperCash Program sends Cash File directly to SuperCash Gateway. SuperCash Gateway sends authorization request to Merchant Bank. Merchant Bank sends authorization request to their Clearing and Settling Service. Clearing and Settling Service sends authorization to Issuer. The Issuer approves or declines authorization and forwards the authorization to the Clearing and Settling Service. Clearing and Settling Service forwards the authorization to the Merchant Bank. Merchant Bank forwards the authorization to the Gateway. Gateway forwards the authorization to the Merchant when the "Complete Transaction" is clicked.

Figure 18:
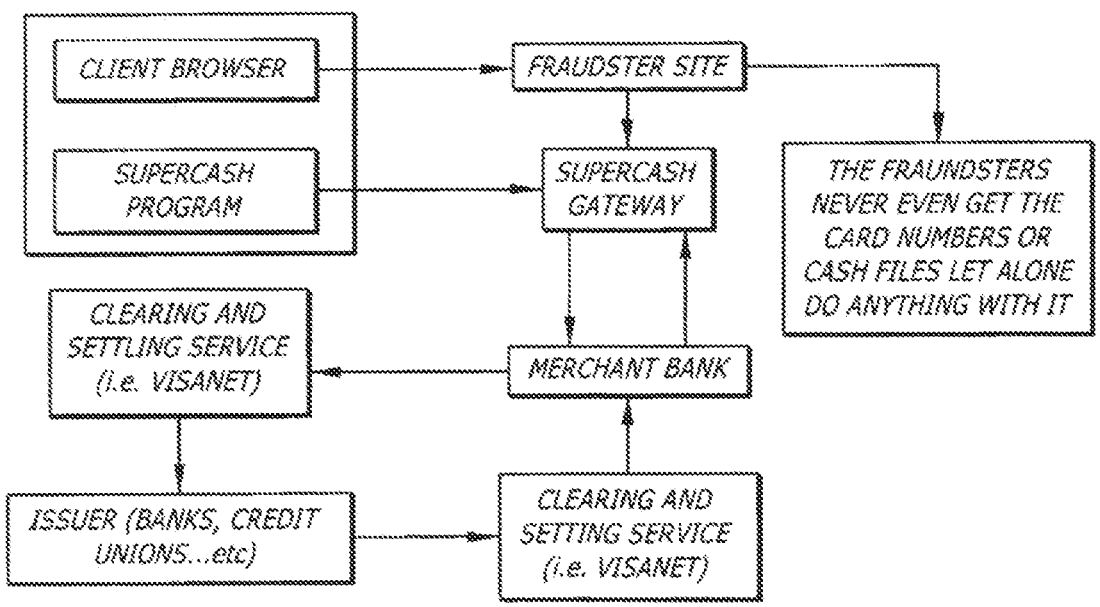
FIG. 18 is a flow chart of fraud failure in the payment system.

Fraud fails in the payment system herein, as illustrated in FIG. 18, wherein the client Browser goes on to fraudster site—The user goes onto the fraudster site because it looks like a legitimate site, there is no way to tell the difference. Fraudster Sites—Phony Merchants, Phished sites and Spammers. The Fraudsters never even gets the Card numbers or cash files, let alone do anything with it.—It's a Dead End.

Figure 19:
FIG. 19 is a flow chart of a current authentication system.

A current authentication system, as seen in FIG. 19, operates to enable the function of the Client Browser, Remote Server, Username, Password.

Figure 20:
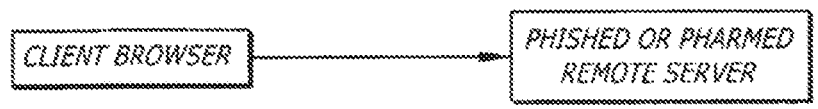
FIG. 20 is a flow chart of a fraud in the current system.

Fraud is committed in the current system, as shown in FIG. 20, wherein client Browser, Phished or Pharmed Remote Server—Username, Password. Fraudsters can login at will once they get the Username and Password.

Figure 21:
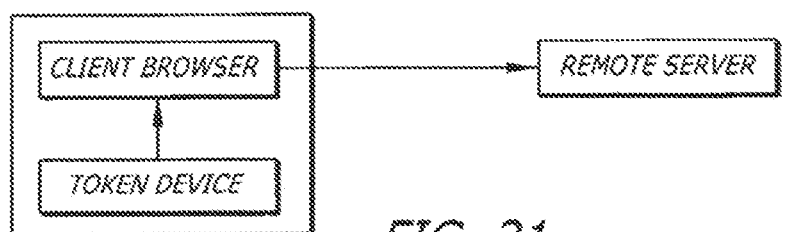
FIG. 21 is a flow chart of a current token system.

A token system, as shown in FIG. 21, includes client Browser, Remote Server—Username, Token, Token Device—Only the user knows the Username. Only the Token Device knows the Token Number—The ever changing Token Number. The user goes online and the remote server asks the client to enter their Username and Token Number. The Token Number is changing every 60 seconds or so.

Figure 22:
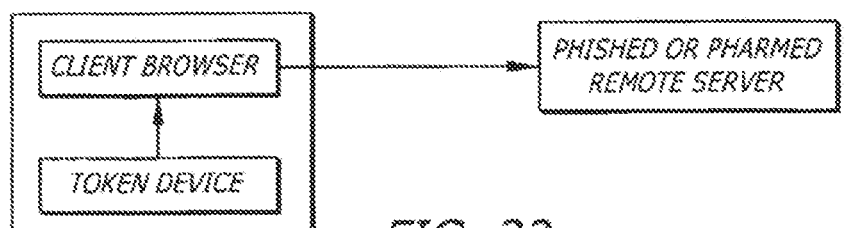
FIG. 22 is a flow chart of fraud in the current token system.

Fraud is committed in the token system, as seen in FIG. 22, as client Browser, Phished or Pharmed Remote Server—The phony server will ask the user for his/her Username—The phony server will also ask for the Token number—Fraudsters can login to the real server and hijack the session but they can't login at will, Token Device.

Figure 23:
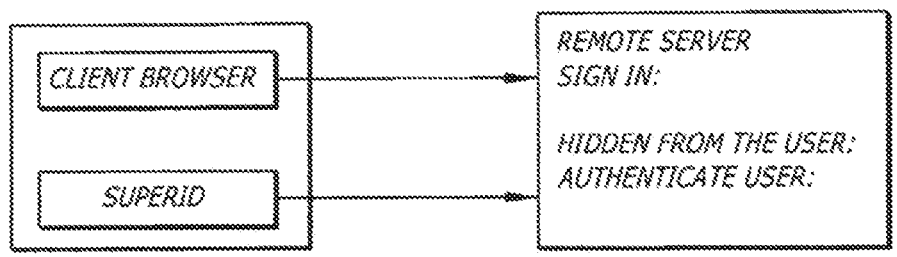
FIG. 23 is a flow chart of a version of the secure authentication system.

In the SuperID system herein, as in FIG. 23, input the authentication device, the user goes to the Remote Server—There is no username. There is no password. There is no Token. The SuperID Program—A password or PIN is all that is required. The SuperID program will authenticate the browser.

Figure 24:
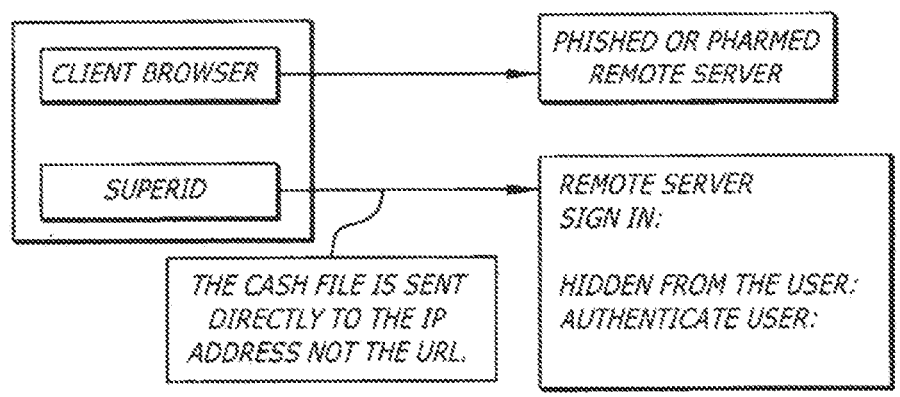
FIG. 24 is a flow chart of a fraud failure in the secure authentication system.

Fraud fails in the SuperID system herein, as shown in FIG. 24, the user goes to the phony Remote Server—No Username is ever given by the client. No Password is ever given by the client. No Token is ever given by the user. Fraudsters can make a site look like the real site but they can't get authentication information. With the SuperID System, the authenticating information is sent directly to the real server with the IP address, not the URL, bypassing the DNS server, making it impossible to be Phished or Pharmed.

Figure 25:
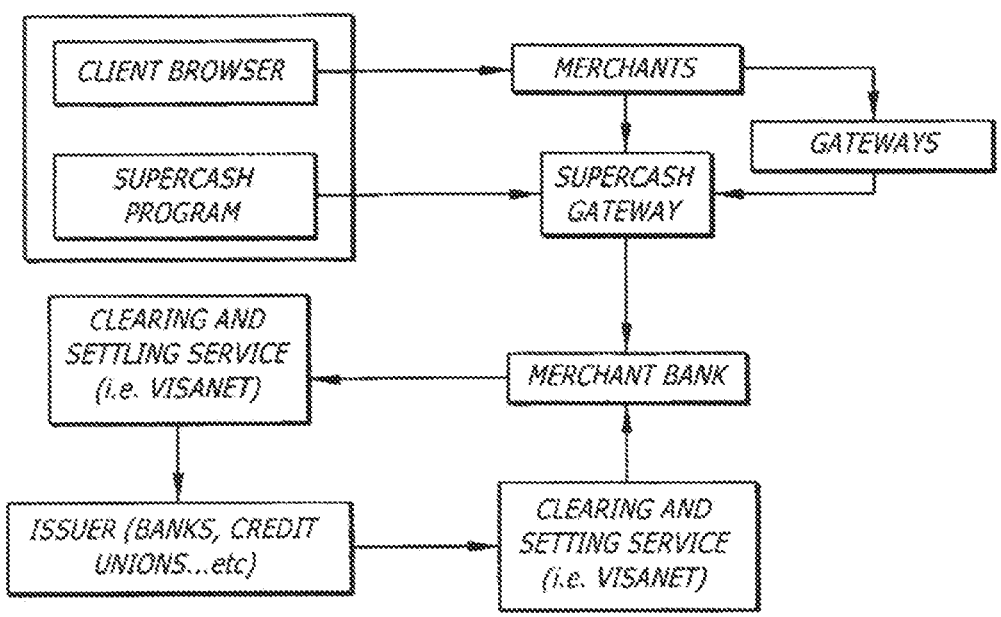
FIG. 25 is a flow chart of a version of the secure transaction system.

In the SuperCash system herein, as seen in FIG. 25, Gateways can add SuperCash to their system. Merchant can add SuperCash directly to their system. Merchants are not limited to what Gateways provide. SuperCash hashes a string composed of—the Password, Card information, Tracking number, Salt, and the Hash, which is onetime use only. Card number with onetime hashed number and tracking number information will fit on current system.

Figure 26:
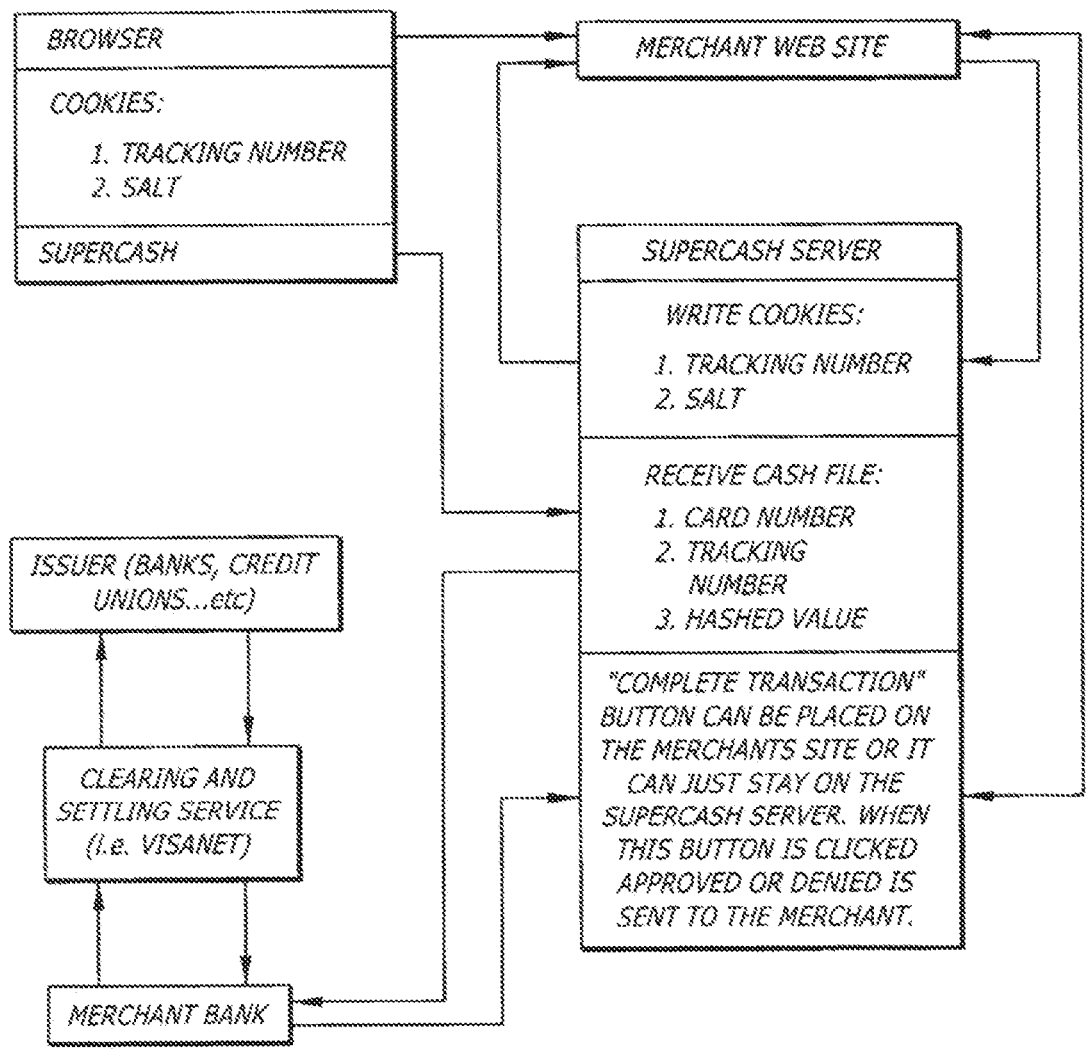
FIG. 26 is a flow chart of the version of the secure transaction system.

The SuperCash system herein, referring to FIG. 26, enables actions to be performed—input the payment device, and the Client shops online. When the user checks out he/she will be re-directed to SuperCash. The SuperCash server writes the "Tracking number" and "Salt" Cookies. There are two kinds of Merchants—For the first kind of Merchant, the Merchant sends Client to Gateway and then waits for approval. The user is not redirected back to the Merchant. Instead an instruction to insert the Disk is displayed along with the "Complete Transaction" button. For the second kind of Merchant, Merchant wants to keep the user on their site to control the user experience—the user is instantly redirected back to the Merchants site. The merchant will then display instructions to insert the Disk along with the "Complete Transaction" button. The user inserts the disk and enters their PIN and clicks the Submit button. The Cash File is sent directly to the SuperCash Server via an IP address, not a URL. This protects against a Phishing and Pharming attacks.

The Cash File is automatically sent to the Merchants Bank. Merchants Bank process payment with its Clearing and Settling Service just like normal. Clearing and Settling Service locates Issuer Bank and sends authorization request. The Issuer authenticates the card number and Cash File (hashed number) and sends approved or denied just like normal. Clearing and Settling Service sends the approved or denied to Merchants Bank as they would normally. The Merchant Bank send authorization approved or denied to SuperCash Server The SuperCash server will send the approved or denied message to the Merchant or Gateway just like normal. If the client is on the SuperCash Server with the "Complete Transaction" button then a POST will be sent to the merchant "approved or denied". If the client is on the merchants site with the "Complete Transaction" button then a POST will be sent to the SuperCash Server requesting authorization status and will receive a POST back from the SuperCash Server "approved or denied".

Figure 42:
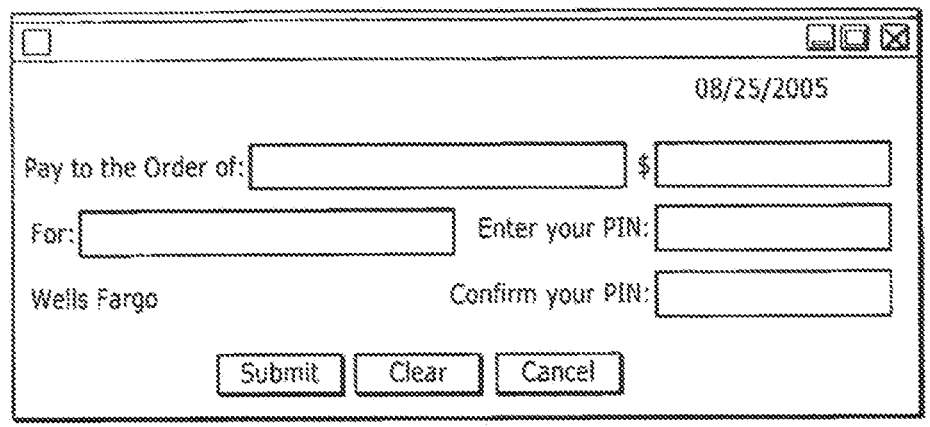
FIG. 42 is a screenshot of a client token window for entry of checking transaction data in the secure authentication and transaction system.
Figure 43:
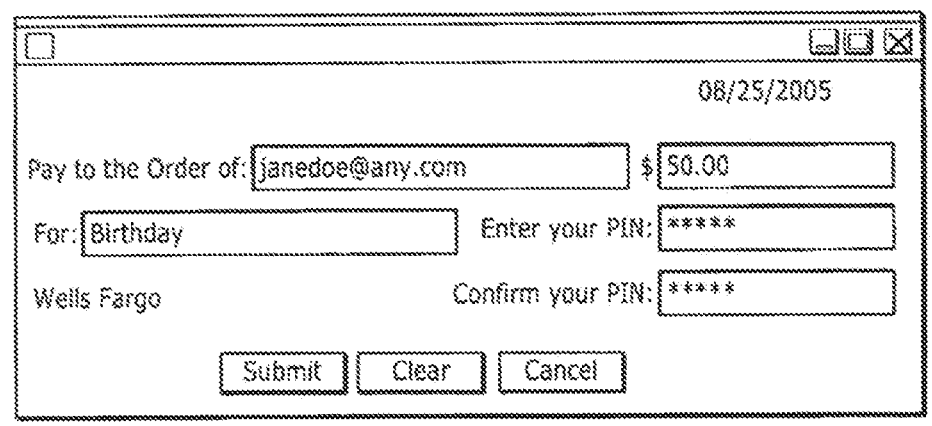
FIG. 43 is a screenshot of a client token window for entry of checking transaction data in the system.
Figure 44:
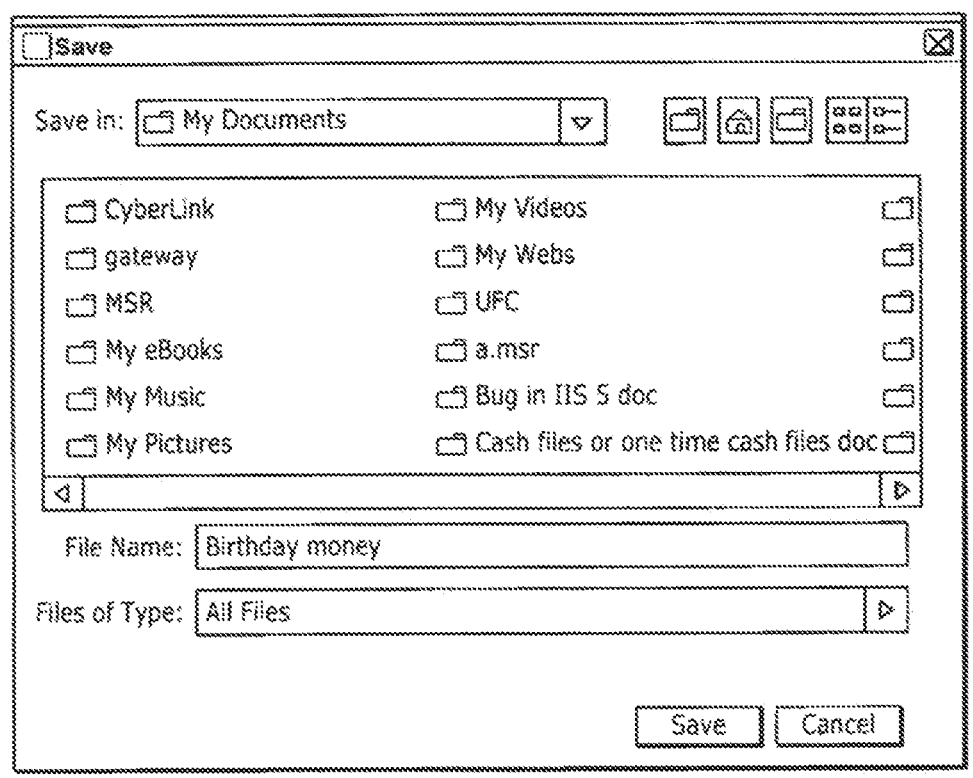
FIG. 44 is a screenshot of a client token window for entry of checking transaction data in the system.

For the SuperCash secure check transaction system herein, as in FIGS. 42-44, the user makes a Cash File that is double encrypted, Hash Functions will not work. The Cash File is saved as a file and can be sent in an email attachment or uploaded during an online banking session. The user makes the cash file payable to a person or entity. It will be important to make each file generated by SuperChecks unique so they can only be used once. Just fill out the SuperCheck and click the "Submit" button. Save the cash file and you are done. The cash file could be emailed to the receiving person or entity. That person can then upload this cash file to their bank while doing their online banking.

While the particular secure authentication and transaction system and method as shown and disclosed in detail herein is fully capable of obtaining the objects and providing the advantages previously stated, it is to be understood that it is merely illustrative of the presently preferred embodiment of the invention, and that no limitations are intended to the details of construction or design shown herein other than as described in the appended claims.

I claim:

1. A method of authenticating a plurality of client devices in an authentication server, comprising the steps of:
   registering an application server site with the authentication server;
   storing first authentication-enabling data unique to a client device of the plurality of client devices and information concerning one or more payment transaction activities enabled over a public computer network;
   receiving a request, at the authentication server from the client device over a secure connection automatically established by a software program of a client token with a unique network address for the authentication server, responsive to actuation of the client token, to authenticate the client device to the application server site and the application server site to the client device for the one or more payment transaction activities over the public computer network;
   authenticating the client device, at the authentication server, with encrypted second authentication-enabling data encrypted and sent by the software program of the client token in the request by decrypting the encrypted second authentication-enabling data and comparing to the first authentication-enabling data;
   authenticating the application server site with a unique identifier by verifying a previous registration; and
   responsive to authenticating the client device and the application server site, enabling the one or more payment transaction activities over the public computer network.

2. A method as in claim 1, wherein the application server site is a publicly available website.

3. A method as in claim 1, wherein the client token requires additional authenticating data received on the client device prior to authentication by the authentication server.

4. A method as in claim 3, wherein the additional authenticating data comprises a passcode.

5. A method as in claim 3, wherein the second authentication-enabling data includes information regarding a passcode.

6. A method as in claim 1, wherein the authentication server is configured to host the application server site.

7. A method as in claim 1, wherein the information concerning one or more payment transaction activities enabled is stored for each client device with respect to each of a plurality of application server sites.

8. A method as in claim 1, wherein the information concerning one or more payment transaction activities enabled is stored for each of a plurality of application server sites with respect to each client device.

9. A method as in claim 1, wherein the first and second authentication-enabling data further comprise information identifying one or more accounts of the client device.

10. A method as in claim 9, wherein the one or more accounts are selected from the group consisting of a credit card account, a debit card account, a check card account, an ATM card account, a payroll account, a financial account, and an ecommerce account.

11. A method as in claim 9, wherein the information identifying one or more accounts is encrypted or hashed for processing by an authorized payment gateway or merchant bank, not by the application server site.

12. A method as in claim 9, wherein the client token contains a unique identifier of each of the one or more accounts.

13. A method as in claim 1, wherein the second authentication-enabling data uses or is based on a cookie.

14. A method as in claim 13, wherein the cookie contains information about the application server site enabled for the client device.

15. A method as in claim 13, wherein the cookie contains information about one or more payment transaction activities enabled for the client device.

16. A method as in claim 1, wherein the second authentication-enabling data is based on a salt for one time use.

17. A method as in claim 1, wherein one of the client token and the authentication server uses a public key and another of the client token and the authentication server uses a private key.

18. A method as in claim 1, wherein the second authentication-enabling data is made out to the authentication server such that only the authentication server with an appropriate key can read the second authentication-enabling data.

19. A method as in claim 1, wherein the second authentication-enabling data is for one time use.

20. A method as in claim 1, wherein the second authentication-enabling data is hashed.

21. A method as in claim 1, wherein the client token is configured to store therein and use an internet protocol address of the authentication server.

22. A method as in claim 1, wherein the client token comprises hardware.

23. A method as in claim 1, wherein the client token is configured to run on the client device and the client device is a computer.

24. A method as in claim 1, wherein the client token comprises a processor and a memory.

25. A method as in claim 1, wherein the authentication server determines whether the application server site is legitimate through authentication.

26. A method as in claim 1, wherein the client token is configured for proximity-based radio frequency communication.

27. A method as in claim 1, wherein the client token is configured to store information about the one or more enabled payment transaction activities for the client device.

28. A method as in claim 1, wherein the client device is redirected by the application server site to the authentication server for authentication and is redirected by the authentication server back to the application server site after authentication.

29. A method as in claim 1, wherein the public computer network is the Internet.

30. A method as in claim 1, wherein the authentication server is configured to perform authentication for a plurality of application server sites.

31. A method as in claim 1, wherein the authentication server is configured to store a signature of the application server site.

32. A method as in claim 31, wherein the token is configured to be carried separately from the client device.

33. A method as in claim 31, wherein the client token is built into the client device.

34. A method as in daim 1, wherein the transaction is a financial transaction.

35. A method of authenticating a plurality of remote mobile devices in an application server site, comprising the steps of:
   sending a request to an authentication server, for an online electronic payment transaction activity over a public computer network from one of the remote mobile devices;
   directing the remote mobile device to the authentication server for authentication;
   receiving an indication from the authentication server that the remote mobile device is authenticated responsive to:
      storing first authentication-enabling data unique to the remote mobile device, and storing information regarding one or more online payment transaction activities enabled for the remote device;
      receiving second authentication-enabling data, corresponding to a client token, from a software program in the client token of the remote device in connection with the request by proximity-based radio frequency communication;
      connecting the client token to the authentication server with an internet protocol address of the authentication server stored in the software program to establish a secure connection;
      authenticating the remote device by sending an encryption produced by the software program of the client token that corresponds to the first authentication-enabling data and the second authentication-enabling data over the secure connection, and decrypting the encryption;
   enabling the electronic payment transaction activity with a registered merchant for the remote mobile device over the public computer network responsive to authentication of the remote device by the authentication server.

36. A method as in claim 35, wherein the client token comprises a downloadable program in a remote computer.

37. A method as in claim 35, wherein the second authentication-enabling data identifies a particular account associated with the remote device.

38. A method as in claim 35, wherein the application server site is hosted at the authentication server.

39. A method as in claim 35, wherein the client token is configured to require additional authenticating data from the remote device prior to requesting authentication to the authentication server.

40. A method as in claim 35, wherein the client token is configured to connect to the authentication server using the internet protocol address stored therein.

41. A method as in claim 40, wherein the client token, upon actuation, is configured to automatically connect to the authentication server.

* * * * *